US010764881B2

(12) United States Patent
Jiao et al.

(10) Patent No.: US 10,764,881 B2
(45) Date of Patent: Sep. 1, 2020

(54) RESOURCE MANAGEMENT METHOD AND RELATED DEVICE

(71) Applicant: Huawei Technologies Co., Ltd., Shenzhen (CN)

(72) Inventors: Shurong Jiao, Shanghai (CN); Meng Hua, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/146,969

(22) Filed: Sep. 28, 2018

(65) Prior Publication Data

US 2019/0037545 A1 Jan. 31, 2019

Related U.S. Application Data

(63) Continuation of application No. PCT/CN2017/070318, filed on Jan. 5, 2017.

(30) Foreign Application Priority Data

Mar. 31, 2016 (WO) ............... PCTCN2016078212
May 12, 2016 (WO) ............... PCTCN2016081925

(51) Int. Cl.
*H04W 72/04* (2009.01)
*H04W 76/30* (2018.01)
(Continued)

(52) U.S. Cl.
CPC ......... *H04W 72/042* (2013.01); *H04L 5/0032* (2013.01); *H04W 76/30* (2018.02);
(Continued)

(58) Field of Classification Search
CPC combination set(s) only.
See application file for complete search history.

(56) References Cited

U.S. PATENT DOCUMENTS 10,110,353 B2 * 10/2018 Novak ................ H04L 5/0005
2010/0085956 A1 4/2010 Ahn et al.
(Continued)

FOREIGN PATENT DOCUMENTS

CN 101867971 A 10/2010
CN 103188818 A 7/2013
(Continued)

OTHER PUBLICATIONS

"TTI shortening and reduced processing time for UL transmissions," Qualcomm Incorporated, 3GPP TSG RAN WG1 #84, R1-160906, 7.3.4.3, Feb. 15-19, 2016, 5 pages, St. Julian's, Malta.

*Primary Examiner* — Warner Wong
(74) *Attorney, Agent, or Firm* — Slater Matsil, LLP

(57) ABSTRACT

Embodiments of the present disclosure provide a resource management method and a related device. The resource management method includes: receiving, by UE, signaling for releasing resource sent by a base station, where the signaling for releasing resource indicates information of resource location; and determining, based on the information of resource location, a time-frequency resource corresponding to the information of resource location in allocated resources already allocated by a network side to the UE, and then releasing the time-frequency resource. The UE may release some of the allocated resources based on an indication of the base station.

25 Claims, 5 Drawing Sheets

(51) Int. Cl.
  *H04W 76/34* (2018.01)
  *H04L 5/00* (2006.01)
  *H04W 72/12* (2009.01)
  *H04W 72/00* (2009.01)
  *H04W 28/00* (2009.01)

(52) U.S. Cl.
  CPC ............ *H04W 76/34* (2018.02); *H04W 28/00* (2013.01); *H04W 72/00* (2013.01); *H04W 72/044* (2013.01); *H04W 72/1289* (2013.01)

(56) References Cited

U.S. PATENT DOCUMENTS

| | | | |
|---|---|---|---|
| 2010/0136993 A1* | 6/2010 | Wen | H04W 72/042 455/450 |
| 2011/0053626 A1 | 3/2011 | Lim et al. | |
| 2013/0028227 A1 | 1/2013 | Kim et al. | |
| 2013/0044699 A1* | 2/2013 | Eriksson | H04W 72/1289 370/329 |
| 2015/0282130 A1 | 10/2015 | Webb et al. | |
| 2015/0289268 A1 | 10/2015 | Ohta et al. | |
| 2015/0296484 A1 | 10/2015 | Ekberg et al. | |
| 2016/0057604 A1 | 2/2016 | Luo et al. | |
| 2017/0171837 A1* | 6/2017 | Chen | H04W 72/04 |
| 2018/0092079 A1* | 3/2018 | Tang | H04W 72/04 |
| 2018/0270722 A1* | 9/2018 | Kim | H04W 36/0072 |
| 2019/0158263 A1 | 5/2019 | Lee et al. | |
| 2020/0022094 A1* | 1/2020 | You | H04W 76/27 |

FOREIGN PATENT DOCUMENTS

| | | |
|---|---|---|
| CN | 103597871 A | 2/2014 |
| CN | 104113851 A | 10/2014 |
| EP | 2343941 A1 | 7/2011 |
| JP | 2013524719 A | 6/2013 |
| JP | 2016504798 A | 2/2016 |
| JP | 2017504259 A | 2/2017 |
| WO | 2014097357 A1 | 6/2014 |
| WO | 2015094914 A1 | 6/2015 |
| WO | 2016041203 A1 | 3/2016 |

* cited by examiner

US 10,764,881 B2

RESOURCE MANAGEMENT METHOD AND RELATED DEVICE

CROSS-REFERENCE TO RELATED APPLICATIONS

This application is a continuation of International Application No. PCT/CN2017/070318, filed on Jan. 5, 2017, which claims priority to International Application No. PCT/CN2016/078212, filed on Mar. 31, 2016, and International Application No. PCT/CN2016/081925, filed on May 12, 2016, all of which are hereby incorporated by reference in their entireties.

TECHNICAL FIELD

The present disclosure relates to the field of communications technologies, and specifically, to a resource management method and a related device.

BACKGROUND

In a Long Term Evolution (LTE) system, a base station sends scheduling signaling such as downlink control information (DCI) to user equipment (UE) by using a physical downlink control channel (PDCCH), allocates a resource such as a time-frequency resource to the UE, and schedules data transmission of the UE. A conventional frame structure of the LTE system is: A length of one transmission time interval (TTI) is equal to a length of one subframe, and one subframe includes 14 orthogonal frequency division multiplexing (OFDM) symbols.

To satisfy a requirement of transmitting a service that is sporadic and that has a quite high requirement on a delay, a concept of a short TTI is introduced, a length of the short TTI is proposed to be one/two/three/four/seven OFDM symbols, and moreover, UE of the short TTI is also required to support a TTI of a conventional length. For the UE of the short TTI, this is related to switching between TTIs of different lengths. If physical layer signaling is used to perform flexible dynamic switching, TTIs of different lengths may overlap each other at a same moment. For example, when carried data is transmitted in a long TTI, a sporadic short TTI and the long TTI overlap each other; or retransmission of data carried in TTIs of different lengths occurs at a same moment, and consequently long and short TTIs overlap each other. For different UEs, first UE transmits data by using a resource allocated by a base station, a short TTI that is needed when second UE transmits a service that is sporadic and that has a quite high requirement on a delay and a long TTI occupied by the first UE may overlap each other, and the first UE and the second UE interfere with each other.

It is mentioned by Qualcomm in R1-160906 of the 3rd Generation Partnership Project (3GPP) that, if TTIs of different lengths overlap each other when UE performs uplink data transmission, a long TTI is partially released, so as to transmit data carried in a short TTI. However, the foregoing solution is applicable to only a case in which TTIs of different lengths of same UE overlap each other. When TTIs of different lengths between different UEs overlap each other, the overlapping is not learned between the UEs, and the UEs interfere with each other. Consequently, data transmission reliability is reduced.

SUMMARY

Embodiments of the present disclosure provide a resource management method and a related device, to effectively reduce interference caused by resource occupation overlapping and improve data transmission reliability.

A first aspect of the embodiments of the present disclosure provides a resource management method. The method includes: receiving, by UE, signaling for releasing resource sent by a base station, where the signaling for releasing resource indicates information of resource location; and determining, based on the information of resource location, a time-frequency resource corresponding to the information of resource location in allocated resources already allocated by a network side to the UE, and then releasing the time-frequency resource. The UE may release some of the allocated resources based on an indication of the base station. Therefore, interference caused by resource occupation overlapping can be effectively reduced and data transmission reliability can be improved.

Optionally, the information of resource location includes at least one of information of a location in time domain, information of a location in frequency domain, a carrier indicator, a beam indicator, and a code resource indicator. That is, the UE may specifically determine, in the allocated resources based on at least one of the information of a location in time domain, the information of a location in frequency domain, the carrier indicator, the beam indicator, and the code resource indicator, the time-frequency resource corresponding to the information of resource location.

Optionally, the information of resource location includes the information of a location in time domain and the information of a location in frequency domain, and the UE determines, based on the information of a location in time domain and the information of a location in frequency domain, a target time period corresponding to the information of a location in time domain and a target frequency corresponding to the information of a location in frequency domain in the allocated resources already allocated by the network side to the UE, and releases the time-frequency resource consisting of the target time period and the target frequency. The base station designates a time domain size and a frequency domain size of a resource that needs to be released, and the UE may release the resource depending on a need, to improve resource utilization.

Optionally, the allocated resources already allocated by the network side to the UE include time and frequency, the information of resource location includes the information of a location in time domain, and the UE determines, based on the information of a location in time domain, a target time period corresponding to the information of a location in time domain in the allocated resources, determines, as a target frequency, each frequency allocated to the UE in the target time period, and releases the time-frequency resource consisting of the target time period and the target frequency. The base station designates only a time domain size of a resource that needs to be released, and all frequency domain resources allocated to the UE in time domain are released. Therefore, the signaling for releasing resource can be simplified, and network signaling load can be reduced.

Optionally, the information of resource location includes the information of a location in frequency domain, and the UE receives radio resource control (RRC) signaling sent by the base station, where the RRC signaling carries a preset time length, or the UE may obtain a preset time length according to a communication protocol between the UE and the base station. The UE determines, based on the preset time length and the information of a location in frequency domain, a target time period of the preset time length and a target frequency corresponding to the information of a location in frequency domain in the allocated resources already allocated by the network side to the UE, and releases the time-frequency resource consisting of the target time period and the target frequency. The base station designates only a frequency domain size of a resource that needs to be released, and a time domain size is notified by the base station to the UE in advance or obtained by the UE according to the communication protocol between the UE and the base station. Therefore, the signaling for releasing resource can be simplified, and network signaling load can be reduced.

Optionally, the information of a location in time domain includes at least one of a quantity of orthogonal frequency division multiplexing (OFDM) symbols, a quantity of transmission time intervals (TTI), and a length of a TTI.

Optionally, the allocated resources already allocated by the network side to the UE include K bundling TTIs, the K bundling TTIs are used to carry K redundancy versions (RV) of a same data block or K data blocks, the target frequency is a part or all of a frequency allocated to the UE in a target TTI in the K bundling TTIs, and K is an integer greater than 1. The target TTI may be one or more TTIs, that is, the UE may release a part or all of an allocated time-frequency resource in one or more TTIs in a group of TTIs.

Optionally, the UE punctures a released part of the target TTI, sends or receives, on a non-released part of the target TTI using a new rate matching parameter, an RV or a data block carried in the target TTI, or sends or receives, on the non-released part by using a new transport block size (TBS), a data block carried in the target TTI. The UE discards an RV or a data block carried by the released part of the target TTI, and may choose to continue to send, by using the non-released part of the target TTI, a part of the RV or data block carried in the target TTI, that is, send the RV or data block as much as possible, or may choose to re-partition the data block carried in the target TTI, and send or receive, using the new TBS, the data block carried in the target TTI.

Optionally, the UE may send or receive, in a next available TTI after the target TTI, an RV or a data block carried in the target TTI, and the UE may choose to send an important RV or data block again in the next available TTI, to ensure data transmission reliability.

Optionally, the UE sends or receives, in a next available TTI after the K bundling TTIs, a last one of the K RVs or a last one of the K data blocks, and the UE may send or receive the last RV or data block again by independently using an available TTI, to ensure data transmission reliability.

Optionally, the allocated resources already allocated by the network side to the UE include a semi-persistent scheduling (SPS) resource, and the target frequency is a part or all of a frequency allocated to the UE in a target TTI in the SPS resource. The target TTI may be one or more TTIs, that is, the UE may release a part or all of a time-frequency resource in one or more of TTIs that are periodically allocated by the network side.

Optionally, the UE punctures a released part of the target TTI, sends or receives, on a non-released part of the target TTI by using a new rate matching parameter, a data block carried in the target TTI, or sends or receives, on the non-released part by using a new TBS, a data block carried in the target TTI. The UE discards a data block carried by the released part of the target TTI, and may choose to continue to send, using the non-released part of the target TTI, a part of the data block carried in the target TTI, that is, send the RV or data block as much as possible, or may choose to re-partition the data block carried in the target TTI, and send or receive, using the new TBS, the data block carried in the target TTI.

Optionally, a first time-frequency resource that the base station is allowed to release is preset, and the UE may determine, based on whether the allocated resources overlap the first time-frequency resource (which includes partial overlapping or full overlapping in time domain and/or frequency domain), whether to receive the signaling for releasing resource. This specifically includes: receiving, by the UE, the signaling for releasing resource if the allocated resources overlap the first time-frequency resource. Alternatively, the UE skips receiving the signaling for releasing resource if the allocated resources do not overlap the first time-frequency resource. That is, when the base station is not allowed to release a resource allocated to the UE, the UE may not receive the signaling for releasing resource sent by the base station. Therefore, power consumption of the UE can be reduced.

Optionally, there is a plurality of choices for a sending time point of the signaling for releasing resource. The sending time point may be located in a period of time in which the time-frequency resource corresponding to the information of resource location indicated by the signaling for releasing resource is located, may be located in a period of time in which the allocated resources are located, or may be located in a designated period of time after a period of time in which the allocated resources are located.

Optionally, if the sending time point of the signaling for releasing resource is specifically located in the period of time in which the time-frequency resource is located, a time point at which the UE receives the signaling for releasing resource is located after a time point at which the UE receives first signaling for scheduling resource sent by the base station, a first time interval exists between the time point at which the signaling for releasing resource is received and the time point at which the first signaling for scheduling resource is received, and the first signaling for scheduling resource indicates the resources allocated by the network side to the UE.

Optionally, the first signaling for scheduling resource further indicates information of resource location used to release a time-frequency resource in the first time interval. That is, the first signaling for scheduling resource may indicate both the resource allocated to the UE and the information of resource location of the released time-frequency resource. Therefore, a quantity of times the UE receives the signaling for releasing resource can be reduced, and power consumption of the UE can be reduced.

Optionally, the UE receives second signaling for scheduling resource sent by the base station, where the second signaling for scheduling resource indicates a time-frequency resource used by a UE set during data retransmission, and the UE set includes at least the UE. The UE may determine, based on the second signaling for scheduling resource, the time-frequency resource, and the allocated resources, a second time-frequency resource used by the UE during data retransmission, and receive data that is carried on the second time-frequency resource and that is in data retransmitted by the base station. That is, UEs may obtain respective retransmission data from the data retransmitted by the base station.

Optionally, the time point at which the UE receives the signaling for releasing resource and a time point at which the UE receives the second signaling for scheduling resource may be in a same period of time; or the time point at which the UE receives the second signaling for scheduling resource may be located in a designated period of time after the time point at which the UE receives the signaling for releasing resource.

Optionally, the second time-frequency resource is at least one part of the time-frequency resource used by the UE set during the data retransmission. If the UE set includes only the UE (that is, one UE), and the base station performs data retransmission only for the UE, the second time-frequency resource may be all of the time-frequency resource used by the UE set during the data retransmission; or if the UE set includes a plurality of UEs including the UE, and the base station simultaneously performs data retransmission for the plurality of UEs, the second time-frequency resource may be a part of the time-frequency resource used by the UE set during the data retransmission.

Optionally, data carried on the time-frequency resource used by the UE set during the data retransmission includes data predetermined to be transmitted to the UE on the time-frequency resource corresponding to the information of resource location indicated by the signaling for releasing resource.

A second aspect of the embodiments of the present disclosure provides a resource management method. The method includes: receiving, by UE, RRC signaling sent by a base station, where the RRC signaling carries a preset time length; or obtaining, by the UE, the preset time length according to a communication protocol between the UE and the base station; receiving signaling for releasing resource sent by the base station, where the signaling for releasing resource is used to only instruct the UE to perform resource release, but does not indicate related information of resource location; determining, by the UE based on the preset time length, a target time period of the preset time length in allocated resources already allocated by a network side to the UE; and releasing the target time period, and releasing each frequency allocated to the UE in the target time period. The UE may release some of the allocated resources based on an indication of the base station. Therefore, interference caused by resource occupation overlapping can be effectively reduced. Moreover, the signaling for releasing resource is simplified, and network signaling load can be reduced.

A third aspect of the embodiments of the present disclosure provides a resource management method. The method includes: sending, by a base station to at least one UE, signaling for releasing resource that indicates information of resource location, where the signaling for releasing resource is used to instruct the at least one UE to determine, based on the information of resource location, a time-frequency resource corresponding to the information of resource location in allocated resources already allocated by a network side to the at least one UE, and release the time-frequency resource. That is, the base station may simultaneously instruct one or more UEs to perform resource release, to improve resource scheduling efficiency and effectively reduce interference caused by resource occupation overlapping.

Optionally, the information of resource location includes at least one of information of a location in time domain, information of a location in frequency domain, a carrier indicator, a beam indicator, and a code resource indicator.

Optionally, there is a plurality of choices for a sending time point of the signaling for releasing resource. The sending time point may be located in a period of time in which the time-frequency resource corresponding to the information of resource location indicated by the signaling for releasing resource is located, may be located in a period of time in which the allocated resources are located, or may be located in a designated period of time after a period of time in which the allocated resources are located.

Optionally, the base station sends second signaling for scheduling resource to the at least one UE, where the second signaling for scheduling resource indicates a time-frequency resource used by a UE set during data retransmission, and the UE set includes the at least one UE, so that the at least one UE may determine, based on the second signaling for scheduling resource, the time-frequency resource, the allocated resources, and a second time-frequency resource used by the at least one UE during data retransmission.

The base station retransmits data to the UE set, and the at least one UE receives data that is carried on the second time-frequency resource and that is in the data retransmitted by the base station, that is, the base station may retransmit the data to each UE.

Optionally, the second time-frequency resource is at least one part of the time-frequency resource used by the UE set during the data retransmission. If the UE set includes only one UE, and the base station performs data retransmission only for the one UE, the second time-frequency resource may be all of the time-frequency resource used by the UE set during the data retransmission; or if the UE set includes a plurality of UEs, and the base station simultaneously performs data retransmission for the plurality of UEs, the second time-frequency resource may be a part of the time-frequency resource used by the UE set during the data retransmission.

Optionally, data carried on the time-frequency resource used by the UE set during the data retransmission includes data predetermined to be transmitted to the at least one UE on the time-frequency resource corresponding to the information of resource location indicated by the signaling for releasing resource.

A fourth aspect of the embodiments of the present disclosure provides a resource management method. The method includes: sending, by a base station, RRC signaling to at least one UE, where the RRC signaling carries a preset time length; and sending, by the base station, signaling for releasing resource to the at least one UE, where the signaling for releasing resource is used to instruct the at least one UE to determine, based on the preset time length, a target time period of the preset time length in allocated resources already allocated by a network side to the at least one UE, determine, as a target frequency, each frequency allocated to the at least one UE in the target time period, and release the target time period and the target frequency.

A fifth aspect of the embodiments of the present disclosure provides UE. The UE includes: a transceiver, configured to receive signaling for releasing resource sent by a base station, where the signaling for releasing resource indicates information of resource location; and a processor, configured to determine, based on the information of resource location, a time-frequency resource corresponding to the information of resource location in allocated resources already allocated by a network side to the UE, and release the time-frequency resource. The UE may release some of the allocated resources based on an indication of the base station. Therefore, interference caused by resource occupation overlapping can be effectively reduced and data transmission reliability can be improved.

Optionally, the information of resource location includes at least one of information of a location in time domain, information of a location in frequency domain, a carrier indicator, a beam indicator, and a code resource indicator.

Optionally, if the information of resource location includes the information of a location in time domain and the information of a location in frequency domain, the determining, by the processor based on the information of resource location, a time-frequency resource corresponding to the information of resource location in allocated resources already allocated by a network side to the UE, and releasing the time-frequency resource includes: determining, based on the information of a location in time domain and the information of a location in frequency domain, a target time period corresponding to the information of a location in time domain and a target frequency corresponding to the information of a location in frequency domain in the allocated resources already allocated by the network side to the UE; and releasing the time-frequency resource consisting of the target time period and the target frequency.

Optionally, the allocated resources already allocated by the network side to the UE include time and frequency, and if the information of resource location includes the information of a location in time domain, the determining, by the processor based on the information of resource location, a time-frequency resource corresponding to the information of resource location in allocated resources already allocated by a network side to the UE, and releasing the time-frequency resource includes: determining, based on the information of a location in time domain, a target time period corresponding to the information of a location in time domain in the allocated resources, and determining, as a target frequency, each frequency allocated to the UE in the target time period; and releasing the time-frequency resource consisting of the target time period and the target frequency.

Optionally, if the information of resource location includes the information of a location in frequency domain, the transceiver is further configured to receive, before receiving the signaling for releasing resource sent by the base station, RRC signaling sent by the base station, where the RRC signaling carries a preset time length, or the processor is further configured to obtain a preset time length according to a communication protocol between the UE and the base station, where the determining, by the processor based on the information of resource location, a time-frequency resource corresponding to the information of resource location in allocated resources already allocated by a network side to the UE, and releasing the time-frequency resource includes: determining, based on the preset time length and the information of a location in frequency domain, a target time period of the preset time length and a target frequency corresponding to the information of a location in frequency domain in the allocated resources already allocated by the network side to the UE; and releasing the time-frequency resource consisting of the target time period and the target frequency.

Optionally, the information of a location in time domain includes at least one of a quantity of OFDM symbols, a quantity of TTIs, and a length of a TTI.

Optionally, the allocated resources already allocated by the network side to the UE include K bundling TTIs, the K bundling TTIs are used to carry K RVs of a same data block or K data blocks, the target frequency is a part or all of a frequency allocated to the UE in a target TTI in the K bundling TTIs, and K is an integer greater than 1.

Optionally, the processor is further configured to puncture a released part of the target TTI; and the transceiver is further configured to send or receive, on a non-released part of the target TTI using a new rate matching parameter, an RV or a data block carried in the target TTI; or the transceiver is further configured to send or receive, on the non-released part by using a new TBS, a data block carried in the target TTI.

Optionally, the transceiver is further configured to send or receive, in a next available TTI after the target TTI, an RV or a data block carried in the target TTI.

Optionally, the transceiver is further configured to send or receive, in a next available TTI after the K bundling TTIs, a last one of the K RVs or a last one of the K data blocks.

Optionally, the allocated resources already allocated by the network side to the UE include an SPS resource, and the target frequency is a part or all of a frequency allocated to the UE in a target TTI in the SPS resource.

Optionally, the processor is further configured to puncture a released part of the target TTI; and the transceiver is further configured to send or receive, on a non-released part of the target TTI using a new rate matching parameter, a data block carried in the target TTI; or the transceiver is further configured to send or receive, on the non-released part using a new TBS, a data block carried in the target TTI.

Optionally, the processor is further configured to determine whether the time-frequency resource consisting of the target time period and the target frequency overlaps a first time-frequency resource, and if at least one time-frequency sub-resource in the time-frequency resource consisting of the target time period and the target frequency overlaps the first time-frequency resource, the UE does not release the at least one time-frequency sub-resource overlapping the first time-frequency resource, but releases a remaining time-frequency sub-resource that is other than the at least one time-frequency sub-resource and that is in the time-frequency resource consisting of the target time period and the target frequency; or if the time-frequency resource consisting of the target time period and the target frequency does not overlap the first time-frequency resource, the UE releases all time-frequency sub-resources in the time-frequency resource consisting of the target time period and the target frequency, where a time-frequency location of the first time-frequency resource is commonly known by all UEs in a serving cell in which the UE is located. For example, the first time-frequency resource is a time-frequency resource used to transmit a common signal. For example, the first time-frequency resource may be a time-frequency resource for transmitting a common signal such as a cell-specific reference signal (CRS), a synchronization signal, or a discovery signal. Alternatively, the first time-frequency resource may be a common channel such as a physical broadcast channel (PBCH). The first time-frequency resource may alternatively be a time-frequency resource of a common resource for uplink transmission, for example, a physical random access channel (PRACH). The first time-frequency resource may alternatively be a time-frequency resource for transmitting a demodulation reference signal (DMRS) and a sounding reference signal (SRS) of the UE.

Optionally, a first time-frequency resource that the base station is allowed to release is preset, and the processor is further configured to determine, based on whether the allocated resources overlap the first time-frequency resource (which includes partial overlapping or full overlapping in time domain and/or frequency domain), whether to receive the signaling for releasing resource; and the transceiver is specifically configured to receive the signaling for releasing resource if the allocated resources overlap the first time-frequency resource; or skip receiving the signaling for releasing resource if the allocated resources do not overlap the first time-frequency resource. That is, when the base station is not allowed to release a resource allocated to the UE, the transceiver may not receive the signaling for releasing resource sent by the base station. Therefore, power consumption of the UE can be reduced.

Optionally, there is a plurality of choices for a sending time point of the signaling for releasing resource. The sending time point may be located in a period of time in which the time-frequency resource corresponding to the information of resource location indicated by the signaling for releasing resource is located, may be located in a period of time in which the allocated resources are located, or may be located in a designated period of time after a period of time in which the allocated resources are located.

Optionally, if the sending time point of the signaling for releasing resource is specifically located in the period of time in which the time-frequency resource is located, a time point at which the transceiver receives the signaling for releasing resource is located after a time point at which the transceiver receives first signaling for scheduling resource sent by the base station, a first time interval exists between the time point at which the signaling for releasing resource is received and the time point at which the first signaling for scheduling resource is received, and the first signaling for scheduling resource indicates the resources allocated by the network side to the UE.

Optionally, the first signaling for scheduling resource further indicates information of resource location used to release a time-frequency resource in the first time interval. That is, the first signaling for scheduling resource may indicate both the resource allocated to the UE and the information of resource location of the released time-frequency resource. Therefore, a quantity of times the UE receives the signaling for releasing resource can be reduced, and power consumption of the UE can be reduced.

Optionally, the transceiver is further configured to receive second signaling for scheduling resource sent by the base station, where the second signaling for scheduling resource indicates a time-frequency resource used by a UE set during data retransmission, and the UE set includes at least the UE; and the processor is further configured to determine, based on the second signaling for scheduling resource, the time-frequency resource, the allocated resources, and a second time-frequency resource used by the UE during data retransmission.

The transceiver is further configured to receive data that is carried on the second time-frequency resource and that is in data retransmitted by the base station. That is, UEs may obtain respective retransmission data from the data retransmitted by the base station.

Optionally, the time point at which the transceiver receives the signaling for releasing resource and a time point at which the transceiver receives the second signaling for scheduling resource are in a same period of time; or the time point at which the transceiver receives the second signaling for scheduling resource is located in a designated period of time after the time point at which the transceiver receives the signaling for releasing resource.

Optionally, the second time-frequency resource is at least one part of the time-frequency resource used by the UE set during the data retransmission. If the UE set includes only the UE (that is, one UE), and the base station performs data retransmission only for the UE, the second time-frequency resource may be all of the time-frequency resource used by the UE set during the data retransmission; or if the UE set includes a plurality of UEs including the UE, and the base station simultaneously performs data retransmission for the plurality of UEs, the second time-frequency resource may be a part of the time-frequency resource used by the UE set during the data retransmission.

Optionally, data carried on the time-frequency resource used by the UE set during the data retransmission includes data predetermined to be transmitted to the UE on the time-frequency resource corresponding to the information of resource location indicated by the signaling for releasing resource.

A sixth aspect of the embodiments of the present disclosure provides UE. The UE includes: a processor, configured to obtain a preset time length; and a transceiver, configured to receive signaling for releasing resource sent by a base station, where the signaling for releasing resource is used to instruct the UE to perform resource release. The processor is further configured to determine, based on the preset time length, a target time period of the preset time length in allocated resources already allocated by a network side to the UE, and determine, as a target frequency, each frequency allocated to the UE in the target time period; and the processor is further configured to release the target time period and the target frequency. The UE may release some of the allocated resources based on an indication of the base station. Therefore, interference caused by resource occupation overlapping can be effectively reduced and data transmission reliability can be improved.

Optionally, the processor is further configured to determine whether the time-frequency resource consisting of the target time period and the target frequency overlaps a first time-frequency resource, and if at least one time-frequency sub-resource in the time-frequency resource consisting of the target time period and the target frequency overlaps the first time-frequency resource, the UE does not release the at least one time-frequency sub-resource overlapping the first time-frequency resource, but releases a remaining time-frequency sub-resource that is other than the at least one time-frequency sub-resource and that is in the time-frequency resource consisting of the target time period and the target frequency; or if the time-frequency resource consisting of the target time period and the target frequency does not overlap the first time-frequency resource, the UE releases all time-frequency sub-resources in the time-frequency resource consisting of the target time period and the target frequency, where a time-frequency location of the first time-frequency resource is commonly known by all UEs in a serving cell in which the UE is located. For example, the first time-frequency resource may be a time-frequency resource used to transmit a common signal. For example, the first time-frequency resource may be a time-frequency resource for transmitting a common signal such as a cell-specific reference signal (CRS), a synchronization signal, or a discovery signal. Alternatively, the first time-frequency resource may be a common channel such as a physical broadcast channel (PBCH). The first time-frequency resource may alternatively be a time-frequency resource of a common resource for uplink transmission, for example, a physical random access channel (PRACH). The first time-frequency resource may alternatively be a time-frequency resource for transmitting a demodulation reference signal (DMRS), a sounding reference signal (SRS), and the like of the UE.

A seventh aspect of the embodiments of the present disclosure provides a base station. The base station includes: a transmitter, configured to send, to at least one UE, signaling for releasing resource that indicates information of resource location, where the signaling for releasing resource is used to instruct the at least one UE to determine, based on the information of resource location, a time-frequency resource corresponding to the information of resource location in allocated resources already allocated by a network side to the at least one UE, and release the time-frequency resource. The UE may release some of the allocated resources based on an indication of the base station. Therefore, interference caused by resource occupation overlapping can be effectively reduced and data transmission reliability can be improved.

Optionally, the information of resource location includes at least one of information of a location in time domain, information of a location in frequency domain, a carrier indicator, a beam indicator, and a code resource indicator.

Optionally, there is a plurality of choices for a sending time point of the signaling for releasing resource. The sending time point may be located in a period of time in which the time-frequency resource corresponding to the information of resource location indicated by the signaling for releasing resource is located, may be located in a period of time in which the allocated resources are located, or may be located in a designated period of time after a period of time in which the allocated resources are located.

Optionally, the transmitter is further configured to send second signaling for scheduling resource to the at least one UE, where the second signaling for scheduling resource indicates a time-frequency resource used by a UE set during data retransmission, and the UE set includes the at least one UE, so that the at least one UE determines a second time-frequency resource based on the second signaling for scheduling resource, the time-frequency resource, and the allocated resources. The transmitter is further configured to retransmit data to the UE set, and the at least one UE receives data that is carried on the second time-frequency resource and that is in the data retransmitted by the transmitter. That is, the base station may retransmit the data to each UE.

Optionally, the second time-frequency resource is at least one part of the time-frequency resource used by the UE set during the data retransmission. If the UE set includes only one UE, and the base station performs data retransmission only for the one UE, the second time-frequency resource may be all of the time-frequency resource used by the UE set during the data retransmission; or if the UE set includes a plurality of UEs, and the base station simultaneously performs data retransmission for the plurality of UEs, the second time-frequency resource may be a part of the time-frequency resource used by the UE set during the data retransmission.

Optionally, data carried on the time-frequency resource used by the UE set during the data retransmission includes data predetermined to be transmitted to the at least one UE on the time-frequency resource corresponding to the information of resource location indicated by the signaling for releasing resource.

An eighth aspect of the embodiments of the present disclosure provides a base station. The base station includes: a transmitter, configured to send RRC signaling to at least one UE, where the RRC signaling carries a preset time length. The transmitter is further configured to send signaling for releasing resource to the at least one UE, where the signaling for releasing resource is used to instruct the at least one UE to determine, based on the preset time length, a target time period of the preset time length in allocated resources already allocated by a network side to the at least one UE, determine, as a target frequency, each frequency allocated to the at least one UE in the target time period, and release the target time period and the target frequency. The UE may release some of the allocated resources based on an indication of the base station. Therefore, interference caused by resource occupation overlapping can be effectively reduced and data transmission reliability can be improved. The signaling for releasing resource is also simplified, and network signaling load can be reduced.

In the embodiments of the present disclosure, the UE receives the signaling for releasing resource sent by the base station, where the signaling for releasing resource indicates the information of resource location, determines, based on the information of resource location, the time-frequency resource corresponding to the information of resource location in the allocated resources already allocated by the network side to the UE, and then releases the time-frequency resource. The UE may release some of the allocated resources based on an indication of the base station. Therefore, interference caused by resource occupation overlapping can be effectively reduced and data transmission reliability can be improved.

BRIEF DESCRIPTION OF THE DRAWINGS

To describe the technical solutions in the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION OF ILLUSTRATIVE EMBODIMENTS

Figure 1:
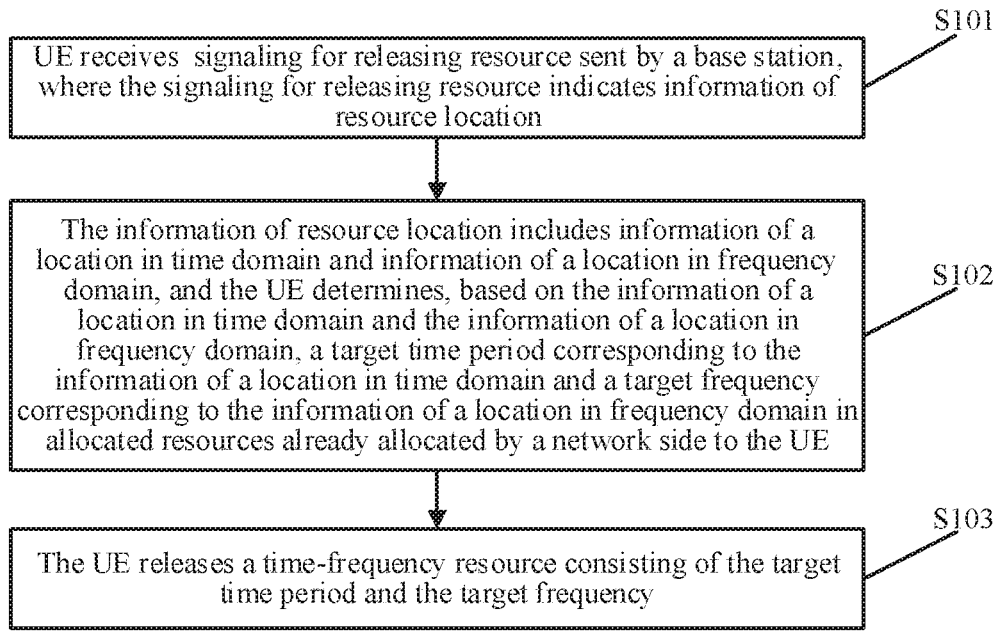
FIG. 1 is a schematic flowchart of a first embodiment of a resource management method according to an embodiment of the present disclosure.

Referring to FIG. 1, FIG. 1 is a schematic flowchart of a first embodiment of a resource management method according to an embodiment of the present disclosure. The resource management method described in this embodiment is mainly described from a side of UE and includes the following steps.

S101. UE receives signaling for releasing resource sent by a base station, where the signaling for releasing resource indicates information of resource location.

Specifically, signaling for releasing resource used to instruct the UE to release a resource is introduced in this embodiment of the present disclosure, and the signaling for releasing resource is simplified relative to scheduling signaling (such as DCI) used to schedule data transmission, and may include only information of resource location. The base station may specifically send the signaling for releasing resource to one or more UEs if it is determined that resource occupation between a plurality of UEs overlaps. For example, first UE performs data transmission by using a resource allocated by a network side, and second UE needs to transmit data of a service satisfying at least one of being sporadic, a high service priority, a high delay requirement, and the like. In this case, a resource allocated by the network side to the second UE may overlap a resource currently occupied by the first UE, and therefore the base station may send the signaling for releasing resource to the first UE.

The information of resource location may include at least one of information of a location in time domain, information of a location in frequency domain, a carrier indicator, a beam indicator, and a code resource indicator. The information of a location in time domain indicates a resource time domain size, and the information of a location in frequency domain indicates a resource frequency domain size. An effective time of the signaling for releasing resource may be the same as an effective time of the scheduling signaling, and an existing time sequence relationship between control and data transmission may remain unchanged.

In some feasible implementations, the network side may divide resources into a resource that the base station is allowed to release and a resource that the base station is not allowed to release, and the resource that the base station is allowed to release is denoted as a preset first time-frequency resource. Before allocating a resource to the UE, the network side may notify, by using broadcast signaling, RRC signaling, or the like, the UE of whether the resource to be allocated to the UE is a resource that the base station is allowed to release or a resource that the base station is not allowed to release. Before performing step S101, the UE first obtains a status of overlapping between the allocated resources already allocated by the network side to the UE and the first time-frequency resource, and then determines, based on the overlapping status, whether to receive the signaling for releasing resource sent by the base station. This specifically includes: if the allocated resources overlap the first time-frequency resource, where the overlapping herein includes partial overlapping or full overlapping in time domain and/or frequency domain, the UE may perform step S101, that is, receive the signaling for releasing resource sent by the base station; or if the allocated resources do not overlap the first time-frequency resource, the UE may not perform step S101, that is, neither receive the signaling for releasing resource sent by the base station, nor perform subsequent steps S102 and S103. That is, if the base station is not allowed to release the resource allocated to the UE, the UE does not receive the signaling for releasing resource, and the UE may be disabled from listening to the signaling for releasing resource, thereby reducing power consumption of the UE.

S102. The information of resource location includes the information of a location in time domain and the information of a location in frequency domain, and the UE determines, based on the information of a location in time domain and the information of a location in frequency domain, a target time period corresponding to the information of a location in time domain and a target frequency corresponding to the information of a location in frequency domain in allocated resources already allocated by a network side to the UE.

S103. The UE releases a time-frequency resource consisting of the target time period and the target frequency.

Specifically, the information of resource location may include the information of a location in time domain and the information of a location in frequency domain, that is, the base station may indicate, based on a quantity of resources needed by another UE, a time domain size and a frequency domain size of a resource that the UE needs to release, the UE determines, in the allocated resources, a time-frequency resource (that is, the resource that needs to be released) corresponding to the information of a location in time domain and the information of a location in frequency domain, and the UE releases the resource depending on a need. Therefore, resource utilization may be improved.

In some feasible implementations, the information of resource location may include only the information of a location in time domain, the allocated resources already allocated by the network side to the UE include time and frequency, and the UE determines, based on the information of a location in time domain, a target time period corresponding to the information of a location in time domain in the allocated resources, determines, as a target frequency, each frequency allocated to the UE in the target time period, and releases the time-frequency resource consisting of the target time period and the target frequency.

Specifically, the signaling for releasing resource sent by the base station indicates only the time domain size of the resource that needs to be released. In this case, the UE may release a time domain resource corresponding to the information of a location in time domain, and release all frequency domain resources allocated to the UE on the time domain resource, and further simplification of the signaling for releasing resource may effectively reduce network signaling load.

In some feasible implementations, it is assumed that a resource release granularity unit is two OFDM symbols released each time, and the allocated resources are ten OFDM symbols numbered 1, 2, 3, 4, 5, 6, 7, 8, 9, and 10. There may be a plurality of choices for a sending time point of the signaling for releasing resource. For example, the sending time point of the signaling for releasing resource is located in a period of time in which the time-frequency resource corresponding to the information of resource location indicated by the signaling for releasing resource is located, and if the time-frequency resource is one resource release granularity unit such as the OFDM symbols numbered 3 and 4, the sending time point of the signaling for releasing resource is located in a period of time in which the OFDM symbols numbered 3 and 4 are located. In another example, if the time-frequency resource is a plurality of resource release granularity units, for example, is specifically two resource release granularity units (the OFDM symbols numbered 3 and 4 and the OFDM symbols numbered 7 and 8), the signaling for releasing resource needs to be sent twice, and sending time points are respectively located in a period of time in which the OFDM symbols numbered 3 and 4 are located and a period of time in which the OFDM symbols numbered 7 and 8 are located. That is, the UE needs to receive, for a plurality of times, the signaling for releasing resource sent by the base station, and which resources of the allocated resources are the time-frequency resource can be quickly determined.

Alternatively, the sending time point of the signaling for releasing resource is located in a period of time in which the allocated resources are located, and if the signaling for releasing resource occupies two OFDM symbols, the sending time point of the signaling for releasing resource may be located in a period of time in which the OFDM symbols numbered 9 and 10 are located. That is, the UE receives the signaling for releasing resource only once at the end of the period of time in which the allocated resources are located, and in this case, the time-frequency resource may be one or more resource release granularity units. For example, if the time-frequency resource is specifically two resource release granularity units (the OFDM symbols numbered 3 and 4 and the OFDM symbols numbered 7 and 8), the UE can determine the time-frequency resource as the OFDM symbols numbered 3 and 4 and the OFDM symbols numbered 7 and 8 only when the UE receives the signaling for releasing resource at the end of the period of time in which the allocated resources are located.

Alternatively, the sending time point of the signaling for releasing resource is located after the period of time in which the allocated resources are located, for example, may be specifically in two neighboring OFDM symbols after a last OFDM symbol in the allocated resources, or may be specifically in two OFDM symbols at a time interval from a last OFDM symbol in the allocated resources. In this case, the UE can also determine the time-frequency resource only when the UE receives the signaling for releasing resource after the period of time in which the allocated resources are located, and for the current ten OFDM symbols 1 to 10, the UE needs to receive the signaling for releasing resource only once.

It should be noted that, in this embodiment of the present disclosure, an example in which the resource release granularity unit is two OFDM symbols released each time is used, and an example in which the allocated resources are ten OFDM symbols is used. Depending on an actual application scenario requirement, the resource release granularity unit may alternatively be another quantity of (such as 1 or 3) OFDM symbols released each time, and the allocated resources may alternatively be another quantity of (such as 5 or 20) OFDM symbols. Certainly, the resource release granularity unit and the allocated resources may be further indicated in a TTI or timeslot form.

In some feasible implementations, if the sending time point of the signaling for releasing resource is located in the period of time in which the time-frequency resource is located, a time point at which the UE receives the signaling for releasing resource may be located after a time point at which the UE receives first signaling for scheduling resource sent by the base station, and the first signaling for scheduling resource is used to allocate a resource to the UE, and indicates the resources allocated by the network side to the UE.

Further, if a time interval between the time point at which the signaling for releasing resource is received and the time point at which the first signaling for scheduling resource is received is denoted as a first time interval, the first signaling for scheduling resource may further indicate the information of resource location used to release a time-frequency resource in the first time interval, that is, the first signaling for scheduling resource indicates both the allocated resources and the time-frequency resource released in the first time interval. For example, for the current ten OFDM symbols 1 to 10, a time-frequency resource released in total is two resource release granularity units (the OFDM symbols numbered 1 and 2 and the OFDM symbols numbered 5 and 6). In this case, the first time interval is the four OFDM symbols numbered 1 to 4, and while indicating that the current ten OFDM symbols 1 to 10 are allocated to the UE, the first signaling for scheduling resource further indicates that a time-frequency resource released in the first time interval is the OFDM symbols numbered 1 and 2. After the first time interval, the UE receives once the signaling for releasing resource whose sending time point is located in a period of time in which the OFDM symbols numbered 5 and 6 are located, and may determine, based on the first signaling for scheduling resource and the signaling for releasing resource, the time-frequency resource released in total, the first signaling for scheduling resource is used to indicate the information of resource location of the time-frequency resource in the first time interval, and the UE may reduce a quantity of times of receiving the signaling for releasing resource.

In some feasible implementations, the information of resource location may include only the information of a location in frequency domain, and the UE determines, based on a preset time length and the information of a location in frequency domain, a target time period of the preset time length and a target frequency corresponding to the information of a location in frequency domain in the allocated resources already allocated by the network side to the UE, and releases the time-frequency resource consisting of the target time period and the target frequency.

Specifically, when the UE performs data transmission, before the base station sends the signaling for releasing resource to the UE, the base station may send higher layer signaling (such as RRC signaling) to the UE, and notify the preset time length to the UE by using the higher layer signaling, or the preset time length may be set in a communication protocol between the UE and the base station, and the UE may directly obtain the preset time length according to the communication protocol and does not need to obtain the preset time length from the base station.

It can be learned that, the signaling for releasing resource sent by the base station indicates only the frequency domain size of the resource that needs to be released, and the preset time length for determining the time domain size is notified by the base station to the UE in advance or is obtained by the UE directly from the communication protocol between the UE and the base station. Further simplification of the signaling for releasing resource may effectively reduce network signaling load.

In some feasible implementations, the signaling for releasing resource may not include the information of resource location, that is, may not indicate the time domain size and the frequency domain size of the resource that needs to be released, and the signaling for releasing resource is further simplified, for example, may include only one bit. When the bit is set to 1, it indicates that the UE needs to perform resource release.

Specifically, when the UE performs data transmission, before the base station sends the signaling for releasing resource to the UE, the base station may send higher layer signaling (such as RRC signaling) to the UE, and notify, to the UE by using the higher layer signaling, the preset time length used to determine the time domain size of the resource that needs to be released, or the preset time length may be set in a communication protocol between the UE and the base station, and all frequency domain resources allocated to the UE on the time domain resource of the time domain size are released.

In some feasible implementations, the information of a location in time domain and the preset time length may specifically include at least one of a quantity of OFDM symbols, a quantity of TTIs, and a length of a TTI. That is, the base station may specifically indicate, using parameters such as the quantity of OFDM symbols, the quantity of TTIs, and the length of a TTI, the time domain size of the resource that the UE needs to release. The information of a location in frequency domain may specifically include a quantity of subcarriers, and is used to indicate the frequency domain size of the resource that the UE needs to release.

In some feasible implementations, the information of resource location may further include the carrier indicator, and if the UE performs data transmission between the UE and the base station by simultaneously using a plurality of carriers, the UE releases the time-frequency resource on only a carrier indicated by the carrier indicator.

In some feasible implementations, the information of resource location may further include the beam indicator, and if the UE performs data transmission between the UE and the base station by simultaneously using a plurality of beams, the UE releases the time-frequency resource on only a beam indicated by the beam indicator.

In some feasible implementations, the information of resource location may further include the code resource indicator, and if the UE performs data transmission between the UE and the base station by simultaneously using a plurality of code channels, the UE releases the time-frequency resource on only a code channel indicated by the code resource indicator.

In some feasible implementations, the information of resource location may further include at least two parameters of the carrier indicator, the beam indicator, and the code resource indicator, and therefore the UE releases the time-frequency resource on only a resource jointly determined by the at least two parameters.

In some feasible implementations, after the UE releases the time-frequency resource, data predetermined to be transmitted to the UE on the time-frequency resource fails to be transmitted to the UE. In this case, the base station may retransmit the data, and the retransmission includes retransmitting the data to the UE or simultaneously retransmitting the data to a plurality of UEs.

During specific implementation, the UE receives second signaling for scheduling resource sent by the base station, the second signaling for scheduling resource indicates a time-frequency resource used by a UE set during data retransmission, that is, the time-frequency resource is a resource used when the base station performs data retransmission for UEs included in the UE set, and the UE set includes at least the UE. The UE determines the time-frequency resource used by the UE set during the data retransmission, determines, based on the time-frequency resource used by the UE set during the data retransmission, the time-frequency resource, and the allocated resources, a second time-frequency resource used by the UE during the data retransmission, and then receives data that is carried on the second time-frequency resource and that is in data retransmitted by the base station, so that the UEs included in the UE set may obtain respective retransmission data from the data retransmitted by the base station.

Data carried on the time-frequency resource used by the UE set during the data retransmission includes: data predetermined to be transmitted to the UE on the time-frequency resource.

In some feasible implementations, for data predetermined to be transmitted to the UE on the time-frequency resource, the base station may retransmit all of the data to the UE at a time, or may retransmit the data to the UE for a plurality of times in batch. If the resource release granularity unit is two OFDM symbols released each time, the allocated resources are the ten OFDM symbols numbered 1, 2, 3, 4, 5, 6, 7, 8, 9, and 10, and the time-frequency resource released by the UE is the four OFDM symbols numbered 3, 4, 7, and 8, when retransmitting data predetermined to be transmitted to the UE on the four OFDM symbols, the base station may directly perform data retransmission using the four OFDM symbols. Certainly, after compression processing is performed on the data predetermined to be transmitted to the UE on the four OFDM symbols, the base station may retransmit the data at a time by using less than four OFDM symbols. Alternatively, the data may be retransmitted for a plurality of times in batch successively by respectively using two OFDM symbols or less than two OFDM symbols. For example, data predetermined to be transmitted to the UE on the two OFDM symbols numbered 3 and 4 is first retransmitted using two OFDM symbols or less than two OFDM symbols, and then data predetermined to be transmitted to the UE on the two OFDM symbols numbered 7 and 8 is retransmitted using two OFDM symbols or less than two OFDM symbols, so that the UE obtains the data that is predetermined to be transmitted to the UE on the four OFDM symbols and that is retransmitted by the base station.

For another example, the UE set includes two UEs: UE 1 and UE 2. It is assumed that the UE 1 is the UE, the UE 1 releases a bandwidth resource of 5 MHz on the two OFDM symbols numbered 3 and 4, and the UE 2 releases a bandwidth resource of 5 MHz on the two OFDM symbols numbered 5 and 6. In this case, the base station needs to retransmit data to the two UEs: the UE 1 and the UE 2, and if the time-frequency resource used by the UE set during the data retransmission is a bandwidth resource of 5 MHz on four OFDM symbols, the UE 1 and the UE 2 may respectively obtain corresponding second time-frequency resources based on respective resource release time points. The second time-frequency resource of the UE 1 may be a bandwidth resource of 5 MHz on first two OFDM symbols of the bandwidth resource of 5 MHz on the four OFDM symbols, and the second time-frequency resource of the UE 2 may be a bandwidth resource of 5 MHz on last two OFDM symbols of the bandwidth resource of 5 MHz on the four OFDM symbols, so that the UE 1 receives data carried on the bandwidth resource of 5 MHz on the first two OFDM symbols, and the UE 2 receives data carried on the bandwidth resource of 5 MHz on the last two OFDM symbols. Certainly, after compression processing is performed on the retransmission data, the base station may retransmit the data by using a time-frequency resource obtained after an OFDM symbol quantity and/or a bandwidth are/is reduced. In this case, the respective second time-frequency resources corresponding to the UE 1 and the UE 2 are also reduced by an equal proportion.

For another example, the UE 1 releases a bandwidth resource of 5 MHz on the two OFDM symbols numbered 3 and 4, the UE 2 also releases the bandwidth resource of 5 MHz on the two OFDM symbols numbered 3 and 4, and the bandwidth resource of 5 MHz released by the UE 1 and the bandwidth resource of 5 MHz released by the UE 2 respectively occupy different frequency band locations on the two OFDM symbols numbered 3 and 4. It is assumed that the bandwidth resource of 5 MHz released by the UE 1 corresponds to a first frequency band location on the two OFDM symbols numbered 3 and 4, and the bandwidth resource of 5 MHz released by the UE 2 corresponds to a second frequency band location on the two OFDM symbols numbered 3 and 4. In this case, the base station needs to retransmit data to the two UEs, the UE 1 and the UE 2, and if the time-frequency resource used by the UE set during the data retransmission is a bandwidth resource of 10 MHz on two OFDM symbols, the UE 1 and the UE 2 may respectively obtain corresponding second time-frequency resources based on respective corresponding frequency band locations. The second time-frequency resource of the UE 1 may be a bandwidth resource of 5 MHz corresponding to the first frequency band location on the two OFDM symbols, and the second time-frequency resource of the UE 2 may be a bandwidth resource of 5 MHz corresponding to the second frequency band location on the two OFDM symbols, so that the UE 1 receives data carried by the bandwidth resource of 5 MHz corresponding to the first frequency band location on the two OFDM symbols, and the UE 2 receives data carried by the bandwidth resource of 5 MHz corresponding to the second frequency band location on the two OFDM symbols. Certainly, after compression processing is performed on the retransmission data, the base station may retransmit the data using a time-frequency resource obtained after an OFDM symbol quantity and/or a bandwidth are/is reduced. In this case, the respective second time-frequency resources corresponding to the UE 1 and the UE 2 are also reduced by an equal proportion.

In some feasible implementations, the time point at which the UE receives the signaling for releasing resource and a time point at which the UE receives the second signaling for scheduling resource may be in a same period of time such as on several same OFDM symbols; or the time point at which the UE receives the second signaling for scheduling resource may be located in a designated period of time after the time point at which the UE receives the signaling for releasing resource. For example, the designated period of time may be specifically several neighboring OFDM symbols after an OFDM symbol corresponding to the time point at which the signaling for releasing resource is received, or may be specifically several OFDM symbols at a time interval from an OFDM symbol corresponding to the time point at which the signaling for releasing resource is received.

In some feasible implementations, the second time-frequency resource is at least one part of the time-frequency resource used by the UE set during the data retransmission. If the UE set includes only the UE (that is, one UE), and the base station performs data retransmission only for the UE, the second time-frequency resource may be all of the time-frequency resource used by the UE set during the data retransmission; or if the UE set includes a plurality of UEs including the UE, and the base station simultaneously performs data retransmission for the plurality of UEs, the second time-frequency resource may be a part of the time-frequency resource used by the UE set during the data retransmission.

In some feasible implementations, data carried on the time-frequency resource used by the UE set during the data retransmission includes: data predetermined to be transmitted to the UE on the time-frequency resource corresponding to the information of resource location indicated by the signaling for releasing resource.

In this embodiment of the present disclosure, the UE receives the signaling for releasing resource sent by the base station, where the signaling for releasing resource indicates the information of resource location; and determines, based on the information of resource location, the time-frequency resource corresponding to the information of resource location in the allocated resources already allocated by the network side to the UE, and then releases the time-frequency resource. The UE may release some of the allocated resources based on an indication of the base station. Therefore, interference caused by resource occupation overlapping can be effectively reduced and data transmission reliability can be improved.

Figure 2:
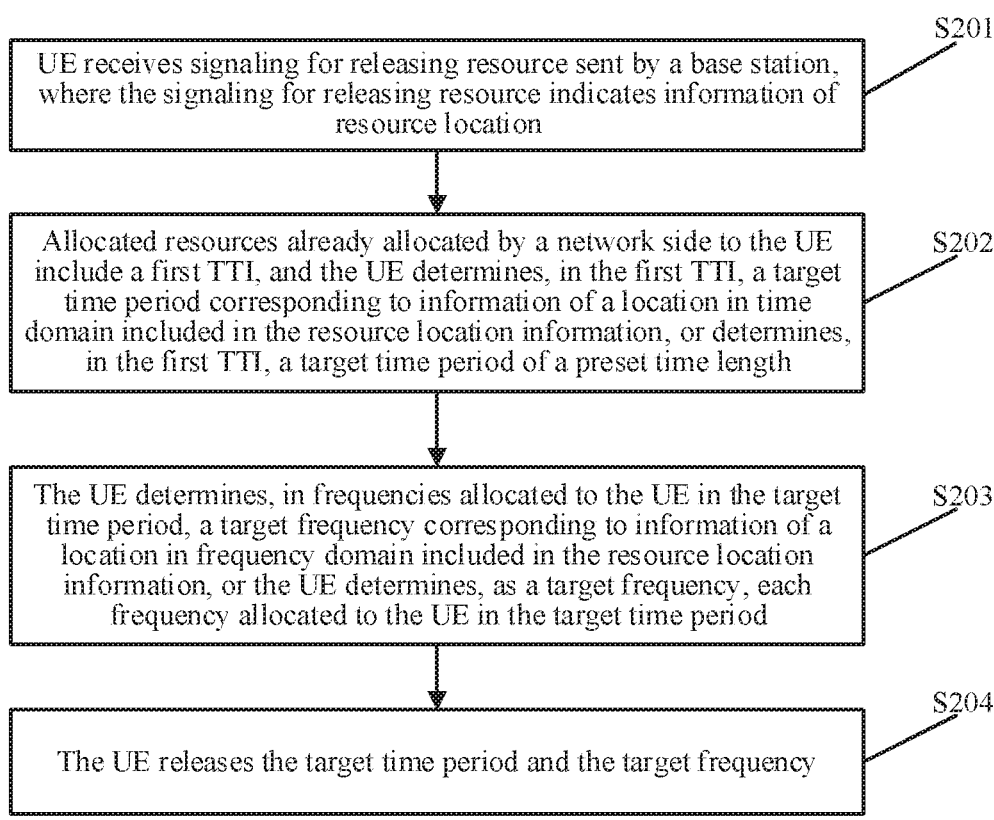
FIG. 2 is a schematic flowchart of a second embodiment of a resource management method according to an embodiment of the present disclosure.

Referring to FIG. 2, FIG. 2 is a schematic flowchart of a second embodiment of a resource management method according to an embodiment of the present disclosure. The resource management method described in this embodiment is mainly described from a side of UE and includes the following steps.

S201. UE receives signaling for releasing resource sent by a base station, where the signaling for releasing resource indicates information of resource location.

S202. Allocated resources already allocated by a network side to the UE include a first TTI, and the UE determines, in the first TTI, a target time period corresponding to information of a location in time domain included in the information of resource location, or the UE determines, in the first TTI, a target time period of a preset time length.

The first TTI may be a long TTI stipulated in a conventional LTE system. The base station may specifically send the signaling for releasing resource to one or more UEs if it is determined that resource occupation between a plurality of UEs overlaps. For example, first UE performs data transmission by using a resource (such as a long TTI) allocated by the network side, and second UE needs to transmit, by using a short TTI, data of a service satisfying at least one of being sporadic, a high service priority, a high delay requirement, and the like. In this case, the short TTI allocated by the network side to the second UE may overlap the long TTI currently occupied by the first UE, and therefore the base station may send, to the first UE, the signaling for releasing resource that indicates the information of resource location. The preset time length and the information of a location in time domain that is included in the information of resource location may include an OFDM symbol quantity or a TTI length corresponding to the short TTI.

Specifically, the UE releases, in the first TTI based on the information of a location in time domain or the preset time length, a corresponding quantity of OFDM symbols or a TTI of a corresponding length.

S203. The UE determines, in frequencies allocated to the UE in the target time period, a target frequency corresponding to information of a location in frequency domain included in the information of resource location, or the UE determines, as a target frequency, each frequency allocated to the UE in the target time period.

S204. The UE releases the target time period and the target frequency.

In this embodiment of the present disclosure, the UE receives the signaling for releasing resource sent by the base station, where the signaling for releasing resource indicates the information of resource location, and the allocated resources already allocated by the network side to the UE include the long TTI. The UE releases, in the long TTI, the information of a location in time domain included in the information of resource location, or a corresponding quantity of OFDM symbols or a TTI of a corresponding length that is indicated by the preset time length, and may release the frequency corresponding to the information of a location in frequency domain included in the information of resource location or each frequency allocated to the UE in the long TTI. The UE may release some of the allocated resources based on an indication of the base station. Therefore, interference caused by resource occupation overlapping can be effectively reduced and data transmission reliability can be improved.

Figure 3:
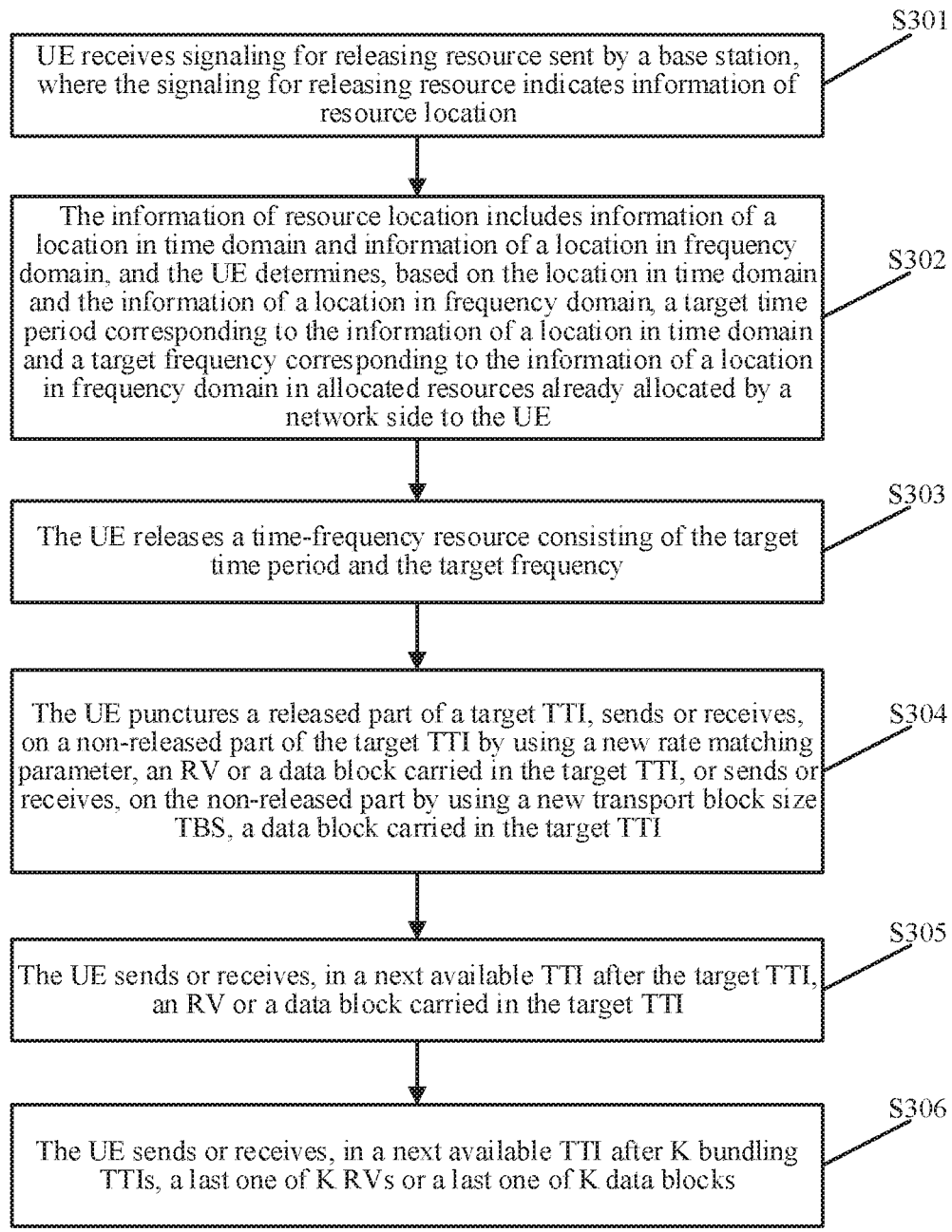
FIG. 3 is a schematic flowchart of a third embodiment of a resource management method according to an embodiment of the present disclosure.

Referring to FIG. 3, FIG. 3 is a schematic flowchart of a third embodiment of a resource management method according to an embodiment of the present disclosure. The resource management method described in this embodiment is mainly described from a side of UE and includes the following steps.

For step S301 to step S303, refer to step S101 to step S103 in the foregoing embodiment. Details are not described herein again.

S304. The allocated resources already allocated by the network side to the UE include K bundling TTIs, the target frequency is a part or all of a frequency allocated to the UE in a target TTI in the K bundling TTIs, and the UE punctures a released part of the target TTI, sends or receives, on a non-released part of the target TTI by using a new rate matching parameter, an RV or a data block carried in the target TTI, or sends or receives, on the non-released part by using a new transport block size (TBS), a data block carried in the target TTI.

K is an integer greater than 1, TTI bundling is to unite a plurality of TTIs to perform data transmission scheduling for one UE, a plurality of TTIs may be scheduled once by using one piece of scheduling signaling, the K bundling TTIs are used to carry K redundancy versions (RV) of a same data block or K data blocks, TTIs for performing bundling may be time-continuous or time-discontinuous, and the target TTI may be one or more TTIs.

Specifically, the bundling TTIs and a single TTI coexist, the target time period released by the UE is the target TTI, and the target frequency is a part or all of the frequency allocated to the UE in the target TTI. The UE punctures the released part of the target TTI. That is, on the released part, a transmit power of uplink data is 0, and downlink data is not received. Alternatively, the UE resets a rate matching parameter based on the non-released part of the target TTI and the RV or data block carried in the target TTI, and sends or receives, on the non-released part by using the new rate matching parameter, the RV or data block carried in the target TTI. Alternatively, the UE re-partitions, based on the non-released part, the data block carried in the target TTI, and sends or receives, by using a new transport block size (TBS), the data block carried in the target TTI.

It should be noted that, if each frequency allocated to the UE in the target TTI is released, the UE neither sends data nor receives data on the target TTI.

S305. The UE sends or receives, in a next available TTI after the target TTI, an RV or a data block carried in the target TTI.

Specifically, if the target TTI carries a most important RV (such as RV 0) of a plurality of RVs of a same data block, the UE may again send or receive, in the next available TTI after the target TTI, the RV carried in the target TTI, to ensure that the most important RV is completely transmitted once. Therefore, data transmission reliability can be improved.

If the target TTI carries a data block, for the data block carried in the target TTI, the UE may choose to send or receive the data block in the next available TTI after the target TTI.

In some feasible implementations, for a data block carried in the target TTI, the UE may choose to not send or not receive the data block in the next available TTI after the target TTI.

S306. The UE sends or receives, in a next available TTI after the K bundling TTIs, a last one of the K RVs or a last one of the K data blocks.

Specifically, the UE may transmit the last RV or the last data block by independently using the next available TTI after the K bundling TTIs in the resources allocated by the network side. Therefore, data transmission reliability can be further improved.

In this embodiment of the present disclosure, the UE receives the signaling for releasing resource sent by the base station, where the signaling for releasing resource indicates the information of resource location; and determines, based on the information of resource location, the time-frequency resource corresponding to the information of resource location in the allocated resources already allocated by the network side to the UE, and then releases the time-frequency resource. In a TTI bundling scenario, the UE punctures the released part of the target TTI of the plurality of bundling TTIs, sends or receives, on the non-released part by using the new rate matching parameter, the RV or data block carried in the target TTI, or sends or receives, on the non-released part by using the new TBS, the data block carried in the target TTI. For an important RV or data block, the UE may again send or receive the important RV or data block in the next available TTI of the plurality of bundling TTIs, and may further send or receive, in the next available TTI after the plurality of bundling TTIs, the last one of the K RVs or the last one of the K data blocks. The UE may release some of the allocated resources based on an indication of the base station, and adjust subsequent transmission of the carried RV or data block in the TTI bundling scenario. Therefore, interference caused by resource occupation overlapping can be effectively reduced and data transmission reliability can be improved.

Figure 4:
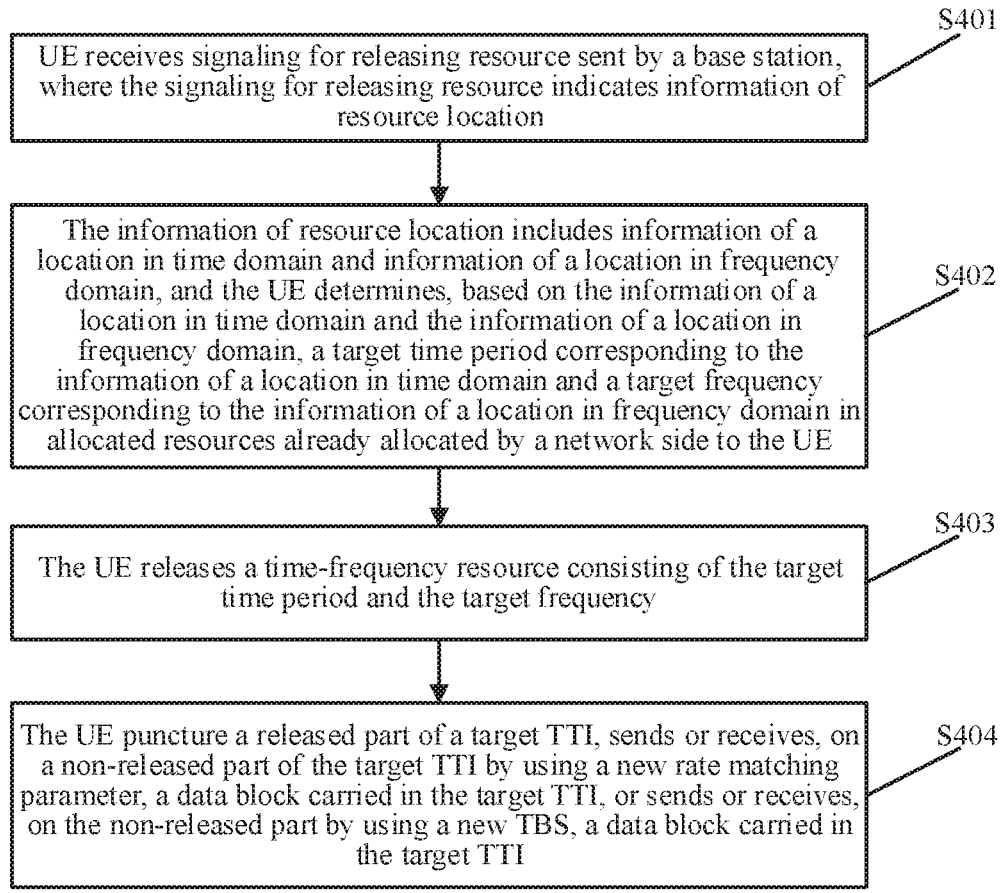
FIG. 4 is a schematic flowchart of a fourth embodiment of a resource management method according to an embodiment of the present disclosure.

Referring to FIG. 4, FIG. 4 is a schematic flowchart of a fourth embodiment of a resource management method according to an embodiment of the present disclosure. The resource management method described in this embodiment is mainly described from a side of UE and includes the following steps.

For step S401 to step S403, refer to step S101 to step S103 in the foregoing embodiment. Details are not described herein again.

S404. The allocated resources already allocated by the network side to the UE include a semi-persistent scheduling (SPS) resource, the target frequency is a part or all of a frequency allocated to the UE in a target TTI in the SPS resource, and the UE punctures a released part of the target TTI, sends or receives, on a non-released part of the target TTI by using a new rate matching parameter, a data block carried in the target TTI, or sends or receives, on the non-released part by using a new TBS, a data block carried in the target TTI.

The semi-persistent scheduling (SPS) resource is a periodic resource configured by the base station for the UE using higher layer signaling (such as RRC signaling), and the UE may persistently perform sending or receiving on the SPS resource, until the base station delivers deactivation scheduling signaling to enable the UE to release the SPS resource.

Specifically, the target time period released by the UE is the target TTI, and the target frequency is a part or all of the frequency allocated to the UE in the target TTI. The signaling for releasing resource is more simplified than the deactivation signaling, the UE may release a part or all of the target TTI in the SPS resource based on the signaling for releasing resource sent by the base station, and the target TTI may specifically include one or more TTIs.

In this embodiment of the present disclosure, optionally, the UE may further determine whether the time-frequency resource consisting of the target time period and the target frequency overlaps a first time-frequency resource, and if at least one time-frequency sub-resource in the time-frequency resource consisting of the target time period and the target frequency overlaps the first time-frequency resource, the UE does not release the at least one time-frequency sub-resource overlapping the first time-frequency resource, but releases a remaining time-frequency sub-resource that is other than the at least one time-frequency sub-resource and that is in the time-frequency resource consisting of the target time period and the target frequency; or if the time-frequency resource consisting of the target time period and the target frequency does not overlap the first time-frequency resource, the UE releases all time-frequency sub-resources in the time-frequency resource consisting of the target time period and the target frequency, where a time-frequency location of the first time-frequency resource is commonly known by all UEs in a serving cell in which the UE is located. In other words, the first time-frequency resource is a time-frequency resource for transmitting high-priority signals, the high-priority signals herein are usually common signals, or some signals that are set, depending on a system requirement, to have a high priority, such as a demodulation reference signal (DMRS) and a sounding reference signal (Sounding RS, or SRS). For example, the first time-frequency resource is a time-frequency resource used to transmit a common signal. For example, the first time-frequency resource may be a time-frequency resource for transmitting a high-priority common signal such as a cell-specific reference signal (CRS), a synchronization signal, or a discovery signal. Alternatively, the first time-frequency resource may be a common channel such as a physical broadcast channel (PBCH). The first time-frequency resource may alternatively be a time-frequency resource of a common resource for uplink transmission, for example, a physical random access channel (PRACH). Alternatively, the first time-frequency resource may be a time-frequency resource for transmitting a DMRS and an SRS of the UE.

Further, the UE punctures the released part of the target TTI. That is, on the released part, a transmit power of uplink data is 0, and downlink data is not received. Alternatively, the UE resets a rate matching parameter based on the non-released part of the target TTI and the data block carried in the target TTI, and sends or receives, on the non-released part by using the new rate matching parameter, the data block carried in the target TTI. Alternatively, the UE re-partitions, based on the non-released part, the data block carried in the target TTI, and sends or receives, using a new TBS, the data block carried in the target TTI.

It should be noted that, if each frequency allocated to the UE in the target TTI is released, the UE neither sends data nor receives data on the target TTI.

In this embodiment of the present disclosure, the UE receives the signaling for releasing resource sent by the base station, where the signaling for releasing resource indicates the information of resource location; and determines, based on the information of resource location, the time-frequency resource corresponding to the information of resource location in the allocated resources already allocated by the network side to the UE, and then releases the time-frequency resource. In a scenario in which the SPS resource is allocated to the UE, the UE punctures the released part of the target TTI in the SPS resource, sends or receives, on the non-released part by using the new rate matching parameter, the data block carried in the target TTI, or sends or receives, on the non-released part by using the new TBS, the data block carried in the target TTI. Therefore, interference caused by resource occupation overlapping can be effectively reduced and data transmission reliability can be improved.

Figure 5:
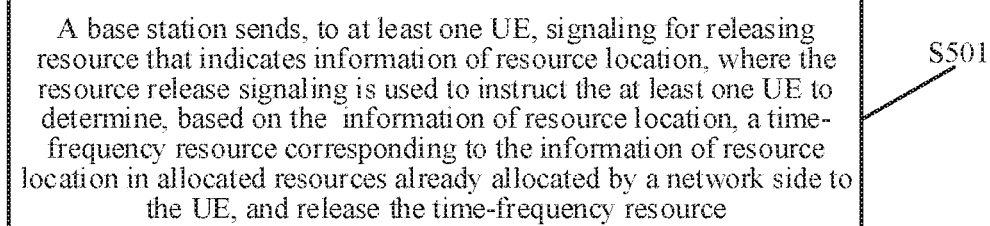
FIG. 5 is a schematic flowchart of a fifth embodiment of a resource management method according to an embodiment of the present disclosure.

Referring to FIG. 5, FIG. 5 is a schematic flowchart of a fifth embodiment of a resource management method according to an embodiment of the present disclosure. The resource management method described in this embodiment is mainly described from a side of a base station and includes the following steps.

S501. A base station sends, to at least one UE, signaling for releasing resource that indicates information of resource location, where the signaling for releasing resource is used to instruct the at least one UE to determine, based on the information of resource location, a time-frequency resource corresponding to the information of resource location in allocated resources already allocated by a network side to the UE, and release the time-frequency resource.

Specifically, the base station may monitor, in real time, a service transmission status of UE covered by the base station, where the service transmission status includes a service type, a service priority, a service delay requirement, and the like; and send the signaling for releasing resource to one or more UEs based on the service transmission status if it is determined that resource occupation between a plurality of UEs overlaps. For example, first UE performs data transmission by using a resource allocated by the network side, and second UE needs to transmit data of a service satisfying at least one of being sporadic, a high service priority, a high delay requirement, and the like. In this case, a resource allocated by the network side to the second UE may overlap a resource currently occupied by the first UE, and therefore the base station may send the signaling for releasing resource to the first UE.

In some feasible implementations, it is assumed that a resource release granularity unit is two OFDM symbols released each time, and the allocated resources are ten OFDM symbols numbered 1, 2, 3, 4, 5, 6, 7, 8, 9, and 10. There may be a plurality of choices for a sending time point of the signaling for releasing resource. For example, the sending time point of the signaling for releasing resource is located in a period of time in which the time-frequency resource corresponding to the information of resource location indicated by the signaling for releasing resource is located, and if the time-frequency resource is one resource release granularity unit such as the OFDM symbols numbered 3 and 4, the sending time point of the signaling for releasing resource is located in a period of time in which the OFDM symbols numbered 3 and 4 are located; or if the time-frequency resource is a plurality of resource release granularity units, for example, is specifically two resource release granularity units (the OFDM symbols numbered 3 and 4 and the OFDM symbols numbered 7 and 8), the base station needs to send the signaling for releasing resource twice, and sending time points are respectively located in a period of time in which the OFDM symbols numbered 3 and 4 are located and a period of time in which the OFDM symbols numbered 7 and 8 are located. That is, the UE needs to receive, for a plurality of times, the signaling for releasing resource sent by the base station, and which resources of the allocated resources are the time-frequency resource can be quickly determined.

Alternatively, the sending time point of the signaling for releasing resource is located in a period of time in which the allocated resources are located, and if the signaling for releasing resource occupies two OFDM symbols, the sending time point of the signaling for releasing resource may be located in a period of time in which the OFDM symbols numbered 9 and 10 are located. That is, the base station sends the signaling for releasing resource to the UE only once at the end of the period of time in which the allocated resources are located, and in this case, the time-frequency resource may be one or more resource release granularity units. For example, if the time-frequency resource is specifically two resource release granularity units (the OFDM symbols numbered 3 and 4 and the OFDM symbols numbered 7 and 8), the UE can determine the time-frequency resource as the OFDM symbols numbered 3 and 4 and the OFDM symbols numbered 7 and 8 only when the UE receives the signaling for releasing resource at the end of the period of time in which the allocated resources are located.

Alternatively, the sending time point of the signaling for releasing resource is located after the period of time in which the allocated resources are located, for example, may be specifically in two neighboring OFDM symbols after a last OFDM symbol in the allocated resources, or may be specifically in two OFDM symbols at a time interval from a last OFDM symbol in the allocated resources. In this case, the UE can also determine the time-frequency resource only when the UE receives the signaling for releasing resource after the period of time in which the allocated resources are located, and for the current ten OFDM symbols 1 to 10, the UE needs to receive the signaling for releasing resource only once.

It should be noted that, in this embodiment of the present disclosure, an example in which the resource release granularity unit is two OFDM symbols released each time is used, and an example in which the allocated resources are ten OFDM symbols is used. Depending on an actual application scenario requirement, the resource release granularity unit may alternatively be another quantity of (such as 1 or 3) OFDM symbols released each time, and the allocated resources may alternatively be another quantity of (such as 5 or 20) OFDM symbols. Certainly, the resource release granularity unit and the allocated resources may be further indicated in a TTI or timeslot form.

In some feasible implementations, after the UE releases the time-frequency resource, data predetermined to be transmitted to the UE on the time-frequency resource fails to be transmitted to the UE. In this case, the base station may retransmit the data, and the retransmission includes retransmitting the data to the UE or simultaneously retransmitting the data to a plurality of UEs.

During specific implementation, the base station sends second signaling for scheduling resource to the at least one UE, the second signaling for scheduling resource indicates a time-frequency resource used by a UE set during data retransmission, that is, the time-frequency resource is a resource used when the base station performs data retransmission for UE included in the UE set, and the UE set includes the at least one UE, so that the at least one UE determines, based on the second signaling for scheduling resource, the time-frequency resource, and the allocated resources, a second time-frequency resource used by the at least one UE during data retransmission. The base station retransmits data to the UE included in the UE set, so that the at least one UE receives data that is carried on the second time-frequency resource and that is in the data retransmitted by the base station, that is, the base station may retransmit the data to each UE. Therefore, the base station sends retransmission data of the UE included in the UE set to the UE.

Data carried on the time-frequency resource used by the UE set during the data retransmission includes: data predetermined to be transmitted to the at least one UE on the time-frequency resource.

In some feasible implementations, for data predetermined to be transmitted to the UE on the time-frequency resource, the base station may retransmit all of the data to the UE at a time, or may retransmit the data to the UE for a plurality of times in batch. If the resource release granularity unit is two OFDM symbols released each time, the allocated resources are the ten OFDM symbols numbered 1, 2, 3, 4, 5, 6, 7, 8, 9, and 10, and the time-frequency resource released by the UE is the four OFDM symbols numbered 3, 4, 7, and 8, when retransmitting data predetermined to be transmitted to the UE on the four OFDM symbols, the base station may directly perform data retransmission using the four OFDM symbols. Certainly, after compression processing is performed on the data predetermined to be transmitted to the UE on the four OFDM symbols, the base station may retransmit the data at a time using less than four OFDM symbols. Alternatively, the data may be retransmitted for a plurality of times in batch successively by respectively using two OFDM symbols or less than two OFDM symbols. For example, data predetermined to be transmitted to the UE on the two OFDM symbols numbered 3 and 4 is first retransmitted using two OFDM symbols or less than two OFDM symbols, and then data predetermined to be transmitted to the UE on the two OFDM symbols numbered 7 and 8 is retransmitted using two OFDM symbols or less than two OFDM symbols, so that the base station retransmits, to the UE, the data that is predetermined to be transmitted to the UE on the four OFDM symbols.

For another example, the UE set includes two UEs: UE 1 and UE 2. It is assumed that the UE 1 is the UE, the UE 1 releases a bandwidth resource of 5 MHz on the two OFDM symbols numbered 3 and 4, and the UE 2 releases a bandwidth resource of 5 MHz on the two OFDM symbols numbered 5 and 6. In this case, the base station needs to retransmit data to the two UEs, the UE 1 and the UE 2, and if the time-frequency resource used by the UE set during the data retransmission is a bandwidth resource of 5 MHz on four OFDM symbols, the UE 1 and the UE 2 may respectively obtain corresponding second time-frequency resources based on respective resource release time points. The second time-frequency resource of the UE 1 may be a bandwidth resource of 5 MHz on first two OFDM symbols of the bandwidth resource of 5 MHz on the four OFDM symbols, and the second time-frequency resource of the UE 2 may be a bandwidth resource of 5 MHz on last two OFDM symbols of the bandwidth resource of 5 MHz on the four OFDM symbols, so that the UE 1 receives data carried on the bandwidth resource of 5 MHz on the first two OFDM symbols, and the UE 2 receives data carried on the bandwidth resource of 5 MHz on the last two OFDM symbols. Certainly, after compression processing is performed on the retransmission data, the base station may retransmit the data using a time-frequency resource obtained after an OFDM symbol quantity and/or a bandwidth are/is reduced. In this case, the respective second time-frequency resources corresponding to the UE 1 and the UE 2 are also reduced by an equal proportion.

For another example, the UE 1 releases a bandwidth resource of 5 MHz on the two OFDM symbols numbered 3 and 4, the UE 2 also releases the bandwidth resource of 5 MHz on the two OFDM symbols numbered 3 and 4, and the bandwidth resource of 5 MHz released by the UE 1 and the bandwidth resource of 5 MHz released by the UE 2 respectively occupy different frequency band locations on the two OFDM symbols numbered 3 and 4. It is assumed that the bandwidth resource of 5 MHz released by the UE 1 corresponds to a first frequency band location on the two OFDM symbols numbered 3 and 4, and the bandwidth resource of 5 MHz released by the UE 2 corresponds to a second frequency band location on the two OFDM symbols numbered 3 and 4. In this case, the base station needs to retransmit data to the two UEs, the UE 1 and the UE 2, and if the time-frequency resource used by the UE set during the data retransmission is a bandwidth resource of 10 MHz on two OFDM symbols, the UE 1 and the UE 2 may respectively obtain corresponding second time-frequency resources based on respective corresponding frequency band locations. The second time-frequency resource of the UE 1 may be a bandwidth resource of 5 MHz corresponding to the first frequency band location on the two OFDM symbols, and the second time-frequency resource of the UE 2 may be a bandwidth resource of 5 MHz corresponding to the second frequency band location on the two OFDM symbols, so that the UE 1 receives data carried by the bandwidth resource of 5 MHz corresponding to the first frequency band location on the two OFDM symbols, and the UE 2 receives data carried by the bandwidth resource of 5 MHz corresponding to the second frequency band location on the two OFDM symbols. Certainly, after compression processing is performed on the retransmission data, the base station may retransmit the data using a time-frequency resource obtained after an OFDM symbol quantity and/or a bandwidth are/is reduced. In this case, the respective second time-frequency resources corresponding to the UE 1 and the UE 2 are also reduced by an equal proportion.

In some feasible implementations, the second time-frequency resource is at least one part of the time-frequency resource used by the UE set during the data retransmission. If the UE set includes only the UE (that is, one UE), and the base station performs data retransmission only for the UE, the second time-frequency resource may be all of the time-frequency resource used by the UE set during the data retransmission; or if the UE set includes a plurality of UEs including the UE, and the base station simultaneously performs data retransmission for the plurality of UEs, the second time-frequency resource may be a part of the time-frequency resource used by the UE set during the data retransmission.

In some feasible implementations, data carried on the time-frequency resource used by the UE set during the data retransmission includes: data predetermined to be transmitted to the UE on the time-frequency resource corresponding to the information of resource location indicated by the signaling for releasing resource.

It should be noted that, when sending the signaling for releasing resource, the base station performs cyclic redundancy code (CRC) check on the signaling for releasing resource, and scrambles the signaling for releasing resource using a radio network temporary identifier (RNTI), and an effective object of the signaling for releasing resource may be changed using a different RNTI. If the signaling for releasing resource is sent to one UE, the signaling for releasing resource is scrambled using an RNTI exclusive to the UE, and only the UE may obtain, through parsing, the signaling for releasing resource; or if the signaling for releasing resource is sent to a group of UEs, the signaling for releasing resource is scrambled using an RNTI shared by the group of UEs, and therefore all UEs included in the group of UEs may obtain, through parsing, the signaling for releasing resource.

In this embodiment of the present disclosure, the base station sends, to the at least one UE, the signaling for releasing resource that indicates the information of resource location, so that the at least one UE may determine, based on the information of resource location, the time-frequency resource corresponding to the information of resource location in the allocated resources already allocated by the network side to the UE, and release the time-frequency resource. One or more UEs may release some of the allocated resources based on an indication of the base station. Therefore, interference caused by resource occupation overlapping can be effectively reduced and data transmission reliability can be improved.

Figure 6:
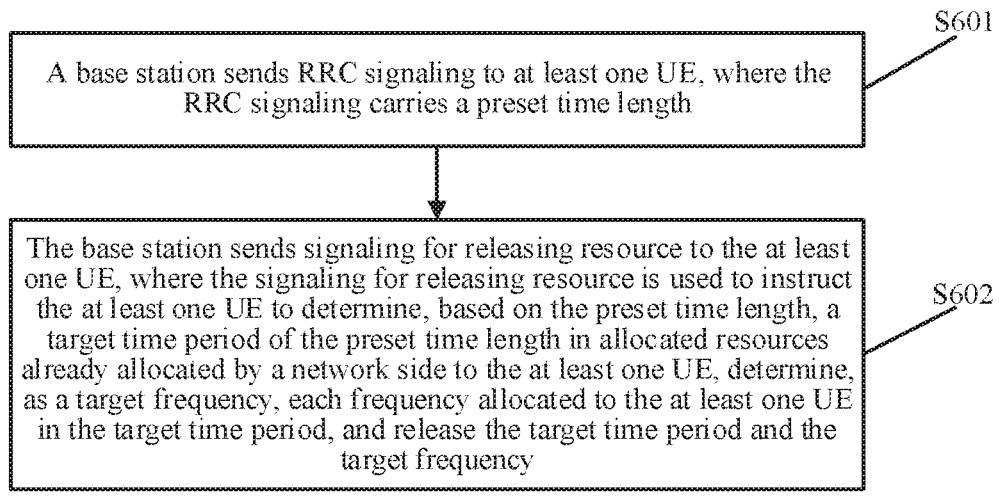
FIG. 6 is a schematic flowchart of a sixth embodiment of a resource management method according to an embodiment of the present disclosure.

Referring to FIG. 6, FIG. 6 is a schematic flowchart of a sixth embodiment of a resource management method according to an embodiment of the present disclosure. The resource management method described in this embodiment is mainly described from a side of a base station and includes the following steps.

S601. A base station sends RRC signaling to at least one UE, where the RRC signaling carries a preset time length.

S602. The base station sends signaling for releasing resource to the at least one UE, where the signaling for releasing resource is used to instruct the at least one UE to determine, based on the preset time length, a target time period of the preset time length in allocated resources already allocated by a network side to the at least one UE, determine, as a target frequency, each frequency allocated to the at least one UE in the target time period, and release the target time period and the target frequency.

Specifically, the signaling for releasing resource may not include the information of resource location, that is, may not indicate the time domain size and the frequency domain size of the resource that needs to be released, and the signaling for releasing resource is further simplified, for example, may include only one bit. When the bit is set to 1, it indicates that the UE obtaining, through parsing, the signaling for releasing resource needs to perform resource release. When the at least one UE performs data transmission, before the base station sends the signaling for releasing resource to the at least one UE, the base station may send higher layer signaling (such as RRC signaling) to the at least one UE, and notify, to the at least one UE using the higher layer signaling, the preset time length used to determine the time domain size of the resource that needs to be released, or the at least one UE obtains the preset time length according to a communication protocol between the at least one UE and the base station, and all frequency domain resources allocated to the at least one UE on the time domain resource of the time domain size are released.

In this embodiment of the present disclosure, the base station sends the RRC signaling to the at least one UE, and notifies the preset time length to the at least one UE, or the preset time length is obtained by the at least one UE according to the communication protocol between the at least one UE and the base station; and the base station sends the signaling for releasing resource to the at least one UE, where the signaling for releasing resource is used to instruct the at least one UE to determine, based on the preset time length, the target time period of the preset time length in the allocated resources already allocated by the network side to the at least one UE, determine, as the target frequency, each frequency allocated to the at least one UE in the target time period, and release the target time period and the target frequency. One or more UEs may release some of the allocated resources based on an indication of the base station, and the signaling for releasing resource is simplified. Therefore, interference caused by resource occupation overlapping can be effectively reduced, data transmission reliability can be improved, and network signaling load can be reduced.

Figure 7:
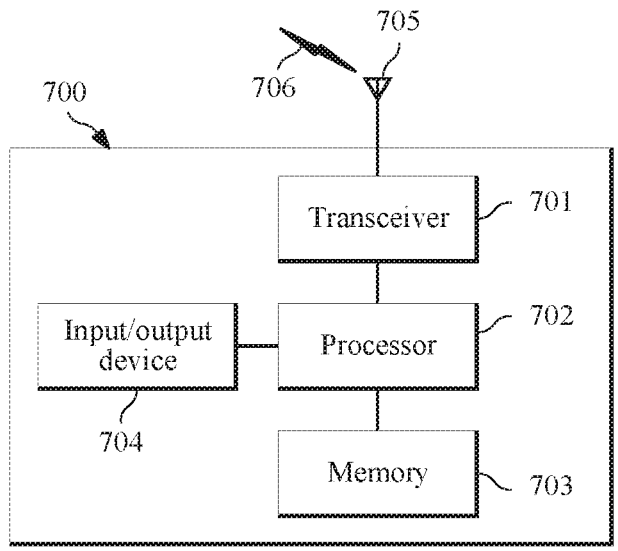
FIG. 7 is a schematic structural diagram of UE according to an embodiment of the present disclosure.

Referring to FIG. 7, FIG. 7 is a schematic structural diagram of UE according to an embodiment of the present disclosure. The UE 700 described in this embodiment includes: a transceiver 701, a processor 702, a memory 703, and an input/output device 704. The processor 702 is connected to the transceiver 701, the memory 703, and the input/output device 704 using a bus.

The transceiver 701 may be specifically a radio frequency receiver or a radio frequency chip, configured to receive/transmit a signal 706 between the UE and a base station using an antenna 705. Specifically, the transceiver 701 may include a transmitter (TX) and a receiver (RX) that are integrated together. The processor 702 may be specifically a baseband processor, a baseband chip, a digital signal processor (DSP), a system on a chip (SOC) including a baseband processor and an application processor, or the like.

The memory 703 is configured to store a set of program code, and the processor 702 is configured to invoke the program code stored in the memory 703, to perform the following operations.

The transceiver 701 is configured to receive signaling for releasing resource sent by a base station, where the signaling for releasing resource indicates information of resource location.

The processor 702 is configured to determine, based on the information of resource location, a time-frequency resource corresponding to the information of resource location in allocated resources already allocated by a network side to the UE, and release the time-frequency resource.

In some feasible implementations, the information of resource location includes the information of a location in time domain and the information of a location in frequency domain, and the determining, by the processor 702 based on the information of resource location, a time-frequency resource corresponding to the information of resource location in allocated resources already allocated by a network side to the UE, and releasing the time-frequency resource includes: determining, based on the information of a location in time domain and the information of a location in frequency domain, a target time period corresponding to the information of a location in time domain and a target frequency corresponding to the information of a location in frequency domain in the allocated resources already allocated by the network side to the UE; and releasing the time-frequency resource consisting of the target time period and the target frequency.

In some feasible implementations, the allocated resources already allocated by the network side to the UE include time and frequency, the information of resource location includes the information of a location in time domain, and the determining, by the processor 702 based on the information of resource location, a time-frequency resource corresponding to the information of resource location in allocated resources already allocated by a network side to the UE, and releasing the time-frequency resource includes: determining, based on the information of a location in time domain, a target time period corresponding to the information of a location in time domain in the allocated resources, and determining, as a target frequency, each frequency allocated to the UE in the target time period; and releasing the time-frequency resource consisting of the target time period and the target frequency.

In some feasible implementations, the information of resource location includes the information of a location in frequency domain, and the transceiver 701 is further configured to receive, before receiving the signaling for releasing resource sent by the base station, RRC signaling sent by the base station, where the RRC signaling carries a preset time length, or the processor 702 is further configured to obtain a preset time length according to a communication protocol between the UE and the base station. In this case, the determining, by the processor 702 based on the information of resource location, a time-frequency resource corresponding to the information of resource location in allocated resources already allocated by a network side to the UE, and releasing the time-frequency resource includes: determining, based on the preset time length and the information of a location in frequency domain, a target time period of the preset time length and a target frequency corresponding to the information of a location in frequency domain in the allocated resources already allocated by the network side to the UE; and releasing the time-frequency resource consisting of the target time period and the target frequency.

In some feasible implementations, the allocated resources already allocated by the network side to the UE include K bundling TTIs, the K bundling TTIs are used to carry K RVs of a same data block or K data blocks, and the target frequency is a part or all of a frequency allocated to the UE in a target TTI in the K bundling TTIs.

The processor 702 is further configured to puncture a released part of the target TTI; the transceiver 701 is further configured to send or receive, on a non-released part of the target TTI using a new rate matching parameter, an RV or a data block carried in the target TTI; or the transceiver 701 is further configured to send or receive, on the non-released part using a new TBS, a data block carried in the target TTI.

In some feasible implementations, the transceiver 701 is further configured to send or receive, in a next available TTI after the target TTI, an RV or a data block carried in the target TTI.

In some feasible implementations, the transceiver 701 is further configured to send or receive, in a next available TTI after the K bundling TTIs, a last one of the K RVs or a last one of the K data blocks.

In some feasible implementations, the allocated resources already allocated by the network side to the UE include an SPS resource, and the target frequency is a part or all of a frequency allocated to the UE in a target TTI in the SPS resource.

The processor 702 is further configured to puncture a released part of the target TTI; the transceiver 701 is further configured to send or receive, on a non-released part of the target TTI by using a new rate matching parameter, a data block carried in the target TTI; or the transceiver 701 is further configured to send or receive, on the non-released part by using a new TBS, a data block carried in the target TTI.

In some feasible implementations, the processor 702 is further configured to perform, based on whether the allocated resources overlap a preset first time-frequency resource, whether to receive the signaling for releasing resource; and the transceiver 701 is specifically configured to receive the signaling for releasing resource if the allocated resources overlap the first time-frequency resource; or skip receiving the signaling for releasing resource if the allocated resources do not overlap the first time-frequency resource, where the first time-frequency resource is a resource that the base station is allowed to release.

In some feasible implementations, a sending time point of the signaling for releasing resource is located in a period of time in which the time-frequency resource is located; a sending time point of the signaling for releasing resource is located in a period of time in which the allocated resources are located; or a sending time point of the signaling for releasing resource is located after a period of time in which the allocated resources are located.

In some feasible implementations, the sending time point of the signaling for releasing resource is located in the period of time in which the time-frequency resource is located, a time point at which the transceiver 701 receives the signaling for releasing resource is located after a time point at which the transceiver 701 receives first signaling for scheduling resource sent by the base station, a first time interval exists between the time point at which the signaling for releasing resource is received and the time point at which the first signaling for scheduling resource is received, and the first signaling for scheduling resource indicates the allocated resources already allocated by the network side.

In some feasible implementations, the first signaling for scheduling resource further indicates information of resource location used to release a time-frequency resource in the first time interval.

In some feasible implementations, the transceiver 701 is further configured to receive second signaling for scheduling resource sent by the base station, where the second signaling for scheduling resource indicates a time-frequency resource used by a UE set during data retransmission, and the UE set includes at least the UE; the processor 702 is further configured to determine a second time-frequency resource based on the second signaling for scheduling resource, the time-frequency resource, and the allocated resources; and the transceiver 701 is further configured to receive data that is carried on the second time-frequency resource and that is in data retransmitted by the base station.

In some feasible implementations, the time point at which the transceiver 701 receives the signaling for releasing resource and a time point at which the transceiver receives the second signaling for scheduling resource are in a same period of time; or the time point at which the transceiver 701 receives the second signaling for scheduling resource is located after the time point at which the transceiver 701 receives the signaling for releasing resource.

In some feasible implementations, the second time-frequency resource is at least one part of the time-frequency resource used by the UE set during the data retransmission.

In some feasible implementations, data carried on the time-frequency resource used by the UE set during the data retransmission includes: data predetermined to be transmitted to the UE on the time-frequency resource.

In some feasible implementations, the transceiver 701 is configured to receive RRC signaling sent by a base station, where the RRC signaling carries a preset time length, or the processor 702 is configured to obtain a preset time length according to a communication protocol between the UE and the base station.

The transceiver 701 is further configured to receive signaling for releasing resource sent by a base station, where the signaling for releasing resource is used to instruct the UE to perform resource release.

The processor 702 is further configured to determine, based on the preset time length, a target time period of the preset time length in the allocated resources already allocated by the network side to the UE, and determine, as a target frequency, each frequency allocated to the UE in the target time period.

The processor 702 is further configured to release the target time period and the target frequency.

In this embodiment of the present disclosure, the UE receives the signaling for releasing resource sent by the base station, where the signaling for releasing resource indicates the information of resource location; and determines, based on the information of resource location, the time-frequency resource corresponding to the information of resource location in the allocated resources already allocated by the network side to the UE, and then releases the time-frequency resource. The UE may release some of the allocated resources based on an indication of the base station. Therefore, interference caused by resource occupation overlapping can be effectively reduced and data transmission reliability can be improved.

Optionally, the processor 702 is further configured to determine whether the target time period and the target frequency overlap the first time-frequency resource, and if at least one time-frequency sub-resource in the target time period and the target frequency overlaps the first time-frequency resource, the processor 702 does not release the time-frequency sub-resource, but releases a sub-resource that is other than the at least one time-frequency sub-resource and that is in the target time period and the target frequency. It should be learned that, the target time period and the target frequency may be considered as one time-frequency resource, where a time-frequency location of the first time-frequency resource is commonly known by all UEs in a serving cell in which the UE is located. For example, the first time-frequency resource may be a time-frequency resource used to transmit a common signal. For example, the first time-frequency resource may be a time-frequency resource for transmitting a common signal such as a cell-specific reference signal (CRS), a synchronization signal, or a discovery signal. Alternatively, the first time-frequency resource may be a common channel such as a physical broadcast channel (PBCH). The first time-frequency resource may alternatively be a time-frequency resource of a common resource for uplink transmission, for example, a physical random access channel (PRACH). The first time-frequency resource may alternatively be a time-frequency resource for transmitting a demodulation reference signal (DMRS) and a sounding reference signal (SRS) of the UE.

Figure 8:
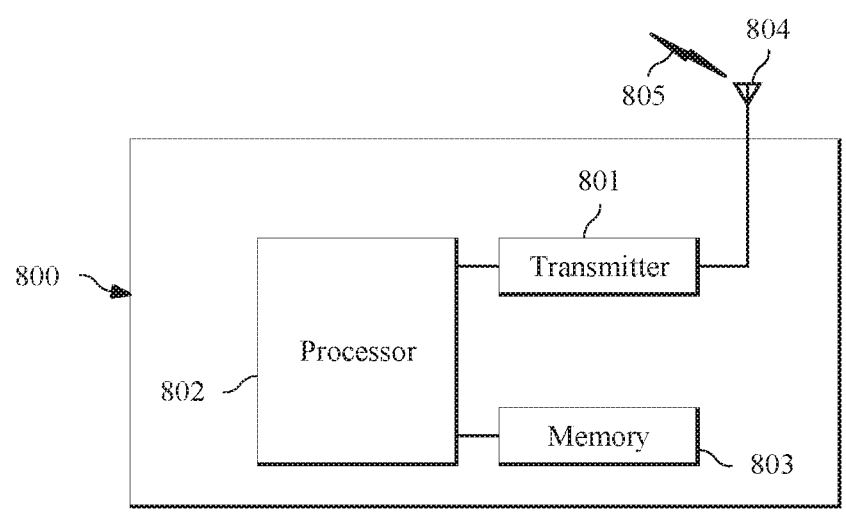
FIG. 8 is a schematic structural diagram of a base station according to an embodiment of the present disclosure.

Referring to FIG. 8, FIG. 8 is a schematic structural diagram of a base station according to an embodiment of the present disclosure. The base station 800 described in this embodiment includes: a transmitter 801, a processor 802, and a memory 803. The processor 802 is connected to the transmitter 801 and the memory 803 using a bus.

The transmitter 801 may be specifically a radio frequency chip, including a transmitter, configured to send a signal 805 to UE by using an antenna 804. The processor 802 may be specifically a baseband processor, a baseband chip, a DSP, an SOC including a baseband processor and an application processor, or the like.

The memory 803 is configured to store a set of program code, and the processor 802 is configured to invoke the program code stored in the memory 803, to control the transmitter 801 to perform the following operation.

The transmitter 801 is configured to send, to at least one UE, signaling for releasing resource that indicates information of resource location, where the signaling for releasing resource is used to instruct the at least one UE to determine, based on the information of resource location, a time-frequency resource corresponding to the information of resource location in allocated resources already allocated by a network side to the UE, and release the time-frequency resource.

In some feasible implementations, a sending time point of the signaling for releasing resource is located in a period of time in which the time-frequency resource is located; a sending time point of the signaling for releasing resource is located in a period of time in which the allocated resources are located; or a sending time point of the signaling for releasing resource is located after a period of time in which the allocated resources are located.

In some feasible implementations, the transmitter 801 is further configured to send second signaling for scheduling resource to the at least one UE, where the second signaling for scheduling resource indicates a time-frequency resource used by a UE set during data retransmission, and the UE set includes the at least one UE, to instruct the at least one UE to determine a second time-frequency resource based on the second signaling for scheduling resource, the time-frequency resource, and the allocated resources; and the transmitter 801 is further configured to retransmit data to the UE set, so that the at least one UE receives data that is carried on the second time-frequency resource and that is in the data retransmitted by the transmitter 801.

In some feasible implementations, the second time-frequency resource is at least one part of the time-frequency resource used by the UE set during the data retransmission.

In some feasible implementations, data carried on the time-frequency resource used by the UE set during the data retransmission includes: data predetermined to be transmitted to the at least one UE on the time-frequency resource.

In some feasible implementations, the transmitter 801 is configured to send RRC signaling to at least one UE, where the RRC signaling carries a preset time length.

The transmitter 801 is further configured to send signaling for releasing resource to the at least one UE, where the signaling for releasing resource is used to instruct the at least one UE to determine, based on the preset time length, a target time period of the preset time length in allocated resources already allocated by a network side to the at least one UE, determine, as a target frequency, each frequency allocated to the at least one UE in the target time period, and release the target time period and the target frequency.

In this embodiment of the present disclosure, the base station sends, to the at least one UE, the signaling for releasing resource that indicates the information of resource location, so that the at least one UE may determine, based on the information of resource location, the time-frequency resource corresponding to the information of resource location in the allocated resources already allocated by the network side to the UE, and release the time-frequency resource. One or more UEs may release some of the allocated resources based on an indication of the base station. Therefore, interference caused by resource occupation overlapping can be effectively reduced and data transmission reliability can be improved.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may be a magnetic disk, an optical disc, a read-only memory (ROM), a random access memory (RAM for short), or the like.

The resource management method and the related device provided in the embodiments of the present disclosure are described above in detail. In this specification, specific examples are used to describe the principle and implementations of the present disclosure, and the description of the embodiments is merely intended to help understand the method and core idea of the present disclosure. Meanwhile, a person of ordinary skill in the art may make, based on the idea of the present disclosure, modifications with respect to the specific implementations and the application scope. Therefore, the content of this specification shall not be construed as a limitation on the present disclosure.

What is claimed is:

1. A method, comprising:
receiving, by a user equipment (UE), resource releasing signaling sent by a base station, wherein the resource releasing signaling indicates information of a resource location;
determining, by the UE based on the information of the resource location, a time-frequency resource corresponding to the information of the resource location in allocated resources that have been allocated by a network side to the UE, the time-frequency resource being a portion of a first resource of the allocated resources, and the first resource being configured for communication of a first data transmission of the UE over the first resource including the time-frequency resource, and releasing the time-frequency resource; and
communicating, by the UE after releasing the time-frequency resource, the first data transmission over the first resource excluding the time-frequency resource that is released; and
wherein the allocated resources that have been allocated by the network side to the UE comprise K bundling transmission time intervals (TTIs), the K bundling TTIs being used to carry K redundancy versions (RVs) of a same data block, wherein a target frequency comprised in the time-frequency resource is a part or all of a frequency allocated to the UE in a target TTI in the K bundling TTIs, and K is an integer greater than 1.

2. The method according to claim 1, wherein the information of the resource location comprises at least information of a location in a time domain, information of a location in a frequency domain, or a carrier indicator.

3. The method according to claim 2, wherein the information of the resource location comprises the information of the location in the time domain and the information of the location in the frequency domain, and determining, by the UE based on the information of the resource location, the time-frequency resource corresponding to the information of the resource location in the allocated resources that have been allocated by the network side to the UE, and releasing the time-frequency resource comprises:
determining, by the UE based on the information of the location in the time domain and the information of the location in the frequency domain, a target time period corresponding to the information of the location in the time domain in the allocated resources, and the target frequency corresponding to the information of the location in the frequency domain in the allocated resources that have been allocated by the network side to the UE; and
releasing, by the UE, the time-frequency resource comprising the target time period and the target frequency.

4. The method according to claim 3, wherein the information of the location in the time domain comprises a quantity of orthogonal frequency division multiplexing (OFDM) symbols.

5. The method according to claim 3, further comprising:
determining, by the UE, whether the time-frequency resource comprising the target time period and the target frequency overlaps a first time-frequency resource; and
when at least one time-frequency sub-resource in the time-frequency resource comprising the target time period and the target frequency overlaps the first time-frequency resource, releasing, by the UE, a remaining time-frequency sub-resource that is other than the at least one time-frequency sub-resource and that is in the time-frequency resource comprising the target time period and the target frequency, wherein a time-frequency location of the first time-frequency resource is known by a plurality of UEs in a serving cell in which the UE is located.

6. The method according to claim 2, wherein the allocated resources that have been allocated by the network side to the UE comprise time and frequency, and the information of the resource location comprises the information of the location in the time domain, wherein the determining, by the UE based on the information of the resource location, the time-frequency resource corresponding to the information of the resource location in the allocated resources that have been allocated by the network side to the UE, and releasing the time-frequency resource comprises:
   determining, by the UE based on the information of the location in the time domain, a target time period corresponding to the information of the location in the time domain in the allocated resources, and determining, as the target frequency, a frequency allocated to the UE in the target time period; and
   releasing, by the UE, the time-frequency resource comprising the target time period and the target frequency.

7. The method according to claim 1, further comprising:
   puncturing, by the UE, a released part of the target TTI to set uplink transmit power on the released part of the target TTI to zero.

8. The method according to claim 1, wherein the allocated resources that have been allocated by the network side to the UE comprise a semi-persistent scheduling (SPS) resource, and the target frequency comprised in the time-frequency resource comprises a part or all of a frequency allocated to the UE in the target TTI in the semi-persistent SPS resource.

9. The method according to claim 8, further comprising:
   puncturing, by the UE, a released part of the target TTI to set uplink transmit power on the released part of the target TTI to zero.

10. A method, comprising:
    obtaining, by a user equipment (UE), a preset time length;
    receiving, by the UE, resource releasing signaling sent by a base station, wherein the resource releasing signaling instructs the UE to perform resource release;
    determining, by the UE based on the preset time length, a target time period of the preset time length in allocated resources that have been allocated by a network side to the UE, and determining, as a target frequency, a frequency allocated to the UE in the target time period;
    releasing, by the UE, a time-frequency resource comprising the target time period and the target frequency, the time-frequency resource being a portion of a first resource of the allocated resources, and the first resource being configured for communication of a first data transmission of the UE over the first resource including the time-frequency resource, wherein the allocated resources that have been allocated by the network side to the UE comprise K bundling transmission time intervals (TTIs), the K bundling TTIs being used to carry K redundancy versions (RVs) of a same data block, and wherein the target frequency comprised in the time-frequency resource is a part or all of a frequency allocated to the UE in a target TTI in the K bundling TTIs, and K is an integer greater than 1; and
    communicating, by the UE after releasing the time-frequency resource, the first data transmission over the first resource excluding the time-frequency resource that is released.

11. The method according to claim 10, wherein obtaining, by the UE, the preset time length comprises:
    receiving, by the UE, radio resource control (RRC) signaling sent by the base station, wherein the RRC signaling carries the preset time length.

12. The method according to claim 10, further comprising:
    determining, by the UE, whether the time-frequency resource comprising the target time period and the target frequency overlaps a first time-frequency resource; and
    when at least one time-frequency sub-resource in the time-frequency resource comprising the target time period and the target frequency overlaps the first time-frequency resource, releasing, by the UE, a remaining time-frequency sub-resource that is other than the at least one time-frequency sub-resource and that is in the time-frequency resource comprising the target time period and the target frequency, wherein a time-frequency location of the first time-frequency resource is known by a plurality of UEs in a serving cell in which the UE is located.

13. A method, comprising:
    sending, by a base station to at least one UE, resource releasing signaling that indicates information of a resource location, wherein the resource releasing signaling instructs the at least one UE to determine, based on the information of the resource location, a time-frequency resource corresponding to the information of the resource location in allocated resources that have been allocated by a network side to the at least one UE, and to release the time-frequency resource, wherein the time-frequency resource is a portion of a first resource of the allocated resources, and the first resource is configured for communication of a first data transmission between the base station and the at least one UE over the first resource including the time-frequency resource; and
    communicating, by the base station with the at least one UE after sending the resource releasing signaling, the first data transmission over the first resource excluding the time-frequency resource that is released; and
    wherein the allocated resources that have been allocated by the network side to the UE comprise K bundling transmission time intervals (TTIs), the K bundling TTIs being used to carry K redundancy versions (RVs) of a same data block, wherein a target frequency comprised in the time-frequency resource is a part or all of a frequency allocated to the UE in a target TTI in the K bundling TTIs, and K is an integer greater than 1.

14. The method according to claim 13, wherein the information of the resource location comprises at least information of a location in a time domain, information of a location in a frequency domain, or a carrier indicator.

15. A user equipment (UE), comprising:
    a transceiver, configured to receive resource releasing signaling sent by a base station, wherein the resource releasing signaling indicates information of a resource location; and
    a processor, configured to determine, based on the information of the resource location, a time-frequency resource corresponding to the information of the resource location in allocated resources that have been allocated by a network side to the UE, the time-frequency resource being a portion of a first resource of the allocated resources, and the first resource being configured for communication of a first data transmission of the UE over the first resource including the time-frequency resource, to release the time-frequency resource, and to communicate the first data transmission over the first resource excluding the time-frequency resource that is released; and wherein the allocated resources that have been allocated by the network side to the UE comprise K bundling transmission time intervals (TTIs), the K bundling TTIs being used to carry K redundancy versions (RVs) of a same data block, wherein a target frequency comprised in the time-frequency resource is a part or all of a frequency allocated to the UE in a target TTI in the K bundling TTIs, and K is an integer greater than 1.

16. The UE according to claim 15, wherein the information of the resource location comprises at least information of a location in a time domain, information of a location in a frequency domain, or a carrier indicator.

17. The UE according to claim 16, wherein the information of the resource location comprises the information of the location in the time domain and the information of the location in the frequency domain, and the processor is configured to:

based on the information of the location in the time domain and the information of the location in the frequency domain, determine a target time period corresponding to the information of the location in the time domain in the allocated resources, and determine the target frequency corresponding to the information of the location in the frequency domain in the allocated resources that have been allocated by the network side to the UE; and release the time-frequency resource comprising the target time period and the target frequency.

18. The UE according to claim 17, wherein the information of the location in the time domain comprises a quantity of orthogonal frequency division multiplexing (OFDM) symbols.

19. The UE according to claim 17, wherein the processor is further configured to:

determine whether the time-frequency resource comprising the target time period and the target frequency overlaps a first time-frequency resource; and when at least one time-frequency sub-resource in the time-frequency resource comprising the target time period and the target frequency overlaps the first time-frequency resource, release a remaining time-frequency sub-resource that is other than the at least one time-frequency sub-resource and that is in the time-frequency resource comprising the target time period and the target frequency, wherein a time-frequency location of the first time-frequency resource is known by a plurality of UEs in a serving cell in which the UE is located.

20. The UE according to claim 16, wherein the allocated resources that have been allocated by the network side to the UE comprise time and frequency, and when the information of the resource location comprises the information of the location in the time domain, the processor is configured to:

determine, based on the information of the location in the time domain, a target time period corresponding to the information of the location in the time domain in the allocated resources, and determine, as the target frequency, a frequency allocated to the UE in the target time period; and release the time-frequency resource comprising the target time period and the target frequency.

21. The UE according to claim 15, wherein the processor is further configured to puncture a released part of the target TTI to set uplink transmission power on the released part of the target TTI to zero.

22. The UE according to claim 15, wherein the allocated resources that have been allocated by the network side to the UE comprise a semi-persistent scheduling (SPS) resource, and the target frequency comprised in the time-frequency resource comprises a part or all of a frequency allocated to the UE in the target TTI in the semi-persistent SPS resource.

23. The UE according to claim 22, wherein the processor is further configured to puncture a released part of the target TTI to set uplink transmission power on the released part of the target TTI to zero.

24. A user equipment (UE), comprising:

a processor, configured to obtain a preset time length; and a transceiver, configured to receive resource releasing signaling sent by a base station, wherein the resource releasing signaling instructs the UE to perform resource release, wherein the processor is further configured to determine, based on the preset time length, a target time period of the preset time length in allocated resources that have been allocated by a network side to the UE, and determine, as a target frequency, a frequency allocated to the UE in the target time period, the processor is further configured to release a time-frequency resource comprising the target time period and the target frequency, the time-frequency resource being a portion of a first resource of the allocated resources, and the first resource being configured for communication of a first data transmission of the UE over the first resource including the time-frequency resource, wherein the allocated resources that have been allocated by the network side to the UE comprise K bundling transmission time intervals (TTIs), the K bundling TTIs being used to carry K redundancy versions (RVs) of a same data block, and wherein the target frequency comprised in the time-frequency resource is a part or all of a frequency allocated to the UE in a target TTI in the K bundling TTIs, and K is an integer greater than 1; and the processor is further configured to communicate, after releasing the time-frequency resource, the first data transmission over the first resource excluding the time-frequency resource that is released.

25. The UE according to claim 24, wherein the processor is further configured to:

determine whether the time-frequency resource comprising the target time period and the target frequency overlaps a first time-frequency resource; and when at least one time-frequency sub-resource in the time-frequency resource comprising the target time period and the target frequency overlaps the first time-frequency resource, release a remaining time-frequency sub-resource that is other than the at least one time-frequency sub-resource and that is in the time-frequency resource comprising the target time period and the target frequency, wherein a time-frequency location of the first time-frequency resource is known by a plurality of UEs in a serving cell in which the UE is located.

* * * * *